(12) United States Patent
Galor Gluskin et al.

(10) Patent No.: US 12,015,835 B2
(45) Date of Patent: Jun. 18, 2024

(54) MULTI-SENSOR IMAGING COLOR CORRECTION

(71) Applicant: QUALCOMM Incorporated, San Diego, CA (US)

(72) Inventors: Micha Galor Gluskin, San Diego, CA (US); Jing Wang, Milpitas, CA (US); Jiafu Luo, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/584,119

(22) Filed: Jan. 25, 2022

(65) Prior Publication Data

US 2023/0239553 A1    Jul. 27, 2023

(51) Int. Cl.
*H04N 23/16* (2023.01)
*G06T 7/90* (2017.01)
*H04N 9/64* (2023.01)
*H04N 9/67* (2023.01)

(52) U.S. Cl.
CPC ............ *H04N 23/16* (2023.01); *G06T 7/90* (2017.01); *H04N 9/646* (2013.01); *H04N 9/67* (2013.01); *G06T 2207/10024* (2013.01); *G06T 2207/10048* (2013.01)

(58) Field of Classification Search
CPC .......... H04N 23/16; H04N 9/646; H04N 9/67; G06T 7/90; G06T 2207/10024; G06T 2207/10048
See application file for complete search history.

(56) References Cited

U.S. PATENT DOCUMENTS

| 10,097,804 | B2* | 10/2018 | Sato ..................... G06T 5/009 |
| 10,586,351 | B1* | 3/2020 | Brailovskiy ......... H04N 23/667 |
| 10,885,675 | B1* | 1/2021 | Shulman ............... G06T 7/0004 |
| 2007/0081086 | A1* | 4/2007 | Ingram ................. H04N 23/16 |
| | | | 348/262 |

(Continued)

FOREIGN PATENT DOCUMENTS

WO    2009151903 A2    12/2009

OTHER PUBLICATIONS

International Search Report and Written Opinion—PCT/US2022/080517—ISA/EPO—Feb. 17, 2023.

(Continued)

*Primary Examiner* — Timothy R Newlin
(74) *Attorney, Agent, or Firm* — Polsinelli/Qualcomm

(57) ABSTRACT

Systems and techniques are provided for processing images. For example, a process can include obtaining a first color image including first one or more pixels from a first image sensor and obtaining a second color image including second one or more pixels from a second sensor, the second color image including infrared (IR) information from a second image sensor. The process can include determining a transformation between colors associated with the first one or more pixels and colors associated with the second one or more pixels based on a comparison associated with the first one or more pixels and the second one or more pixels. The process can include generating a color corrected image at least in part by transforming the second color image including IR information to a color corrected image based on the determined transformation.

28 Claims, 19 Drawing Sheets

(56) References Cited

U.S. PATENT DOCUMENTS

| | | | | |
|---|---|---|---|---|
| 2007/0183657 A1* | 8/2007 | Kidono | ............... | H04N 25/131 |
| | | | | 382/162 |
| 2010/0207958 A1* | 8/2010 | Kimura | ................ | H04N 23/84 |
| | | | | 345/596 |
| 2012/0154596 A1* | 6/2012 | Wajs | .................. | G06T 5/002 |
| | | | | 348/E5.09 |
| 2013/0141611 A1* | 6/2013 | Hirai | .................. | G06T 5/002 |
| | | | | 348/E9.002 |
| 2014/0198185 A1* | 7/2014 | Haugen | ................ | G06T 7/593 |
| | | | | 348/47 |
| 2015/0347821 A1* | 12/2015 | Choi | .................... | G06V 10/17 |
| | | | | 345/156 |
| 2017/0078596 A1* | 3/2017 | Chesnokov | ............ | H04N 9/646 |
| 2017/0374299 A1* | 12/2017 | Liu | ...................... | H04N 1/6008 |
| 2018/0005406 A1* | 1/2018 | Dai | ............................ | G06T 7/73 |
| 2018/0040107 A1* | 2/2018 | Hayashi | .................. | G06T 5/73 |
| 2018/0184055 A1* | 6/2018 | Kikuchi | ................. | H04N 25/17 |
| 2018/0270461 A1* | 9/2018 | Huang | ................. | H04N 25/131 |
| 2019/0007665 A1* | 1/2019 | Hjelmström | ............. | H04N 5/33 |
| 2019/0364206 A1* | 11/2019 | Dal Mutto | ........... | H04N 23/698 |
| 2019/0378257 A1* | 12/2019 | Fan | ...................... | H04N 25/135 |
| 2020/0112678 A1* | 4/2020 | Chang | ................ | G02B 13/0045 |
| 2020/0193569 A1* | 6/2020 | Aoki | ........................ | G06T 5/50 |
| 2021/0195117 A1* | 6/2021 | An | .......................... | G06T 5/001 |
| 2023/0196530 A1* | 6/2023 | Kobayashi | ............. | G06T 5/003 |
| | | | | 382/254 |

OTHER PUBLICATIONS

Skorka O., et al., "Color Correction for RGB Sensors with Dual-Band Filters for In-Cabin Imaging Applications", Electronic Imaging, vol. 2019, No. 15, Jan. 13, 2019, 8 Pages, XP055715959, US, ISSN: 2470-1173, DOI: 10.2352 ISSN.2470-1173.2019.15.AVM-046, Sections "Dual-Band Imaging" and "Experimental Results".

* cited by examiner

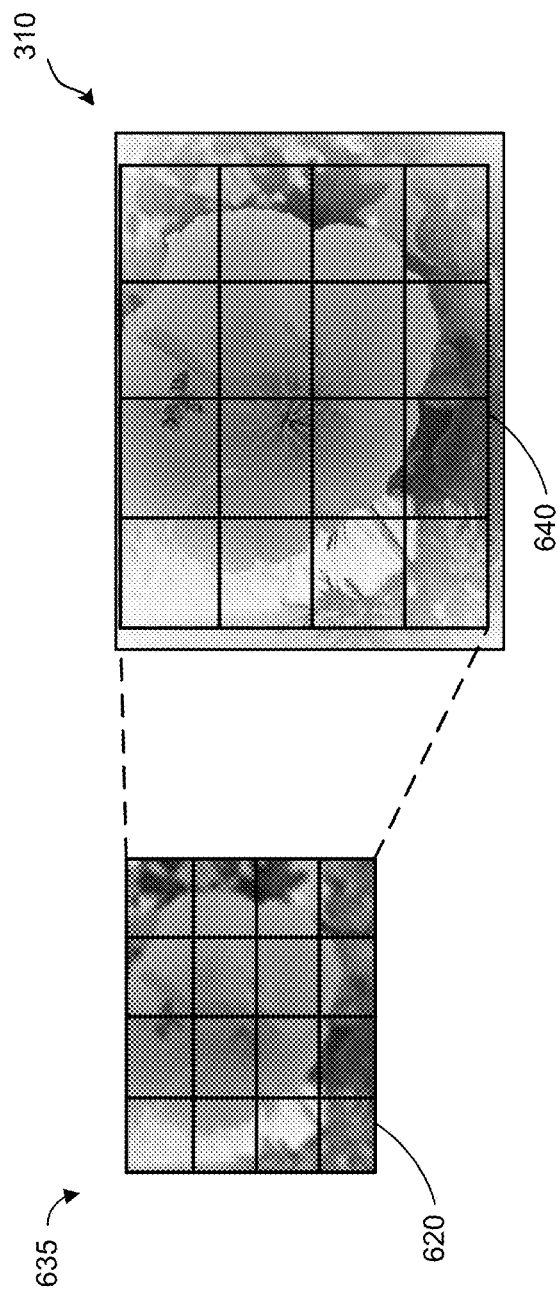

MULTI-SENSOR IMAGING COLOR CORRECTION

FIELD

This application is related to image processing. More specifically, aspects of the application relate to systems and techniques of correcting color in images based on color information from multiple image sensors.

BACKGROUND

Many devices and systems allow a scene to be captured by generating images (or frames) and/or video data (including multiple frames) of the scene. For example, a camera or a device including a camera (or cameras) can capture a sequence of frames of a scene (e.g., a video of a scene). In some cases, the sequence of frames can be processed for performing one or more functions, can be output for display, can be output for processing and/or consumption by other devices, among other uses.

Some devices are configured to capture color images by detecting color (e.g., visible spectrum) light. In some cases, color images can include red, green, and blue (RGB) color components. In some cases, an IR cut filter can be positioned (e.g., between an image sensor and a lens of the color image capture device to block infrared (IR) light from being detected by an image sensor included in a color (e.g., RGB) image capture device. In some cases, an RGB image sensor can include R photodiodes, G photodiodes, and B photodiodes.

Some devices can be configured to detect both color and IR light, and are referred to as RGB plus IR image capture devices or RGBIR image capture devices herein. For example, an image sensor included in an RGBIR image capture device may detect RGB and IR light components and an image produced by the RGBIR image capture device can include RGB and IR signal values. In some cases, an IR cut filter used in RGB image capture devices can be omitted, thereby allowing IR light to reach an RGBIR image sensor. In some cases, an RGBIR image capture device can include R photodiodes, G photodiodes, B photodiodes and IR photodiodes. In some cases, the RGB photodiodes of an RGBIR image capture device may be sensitive to IR light, and as a result the color signal values produced by the RGB photodiodes of the RGBIR image capture device can be inaccurate. In some examples, an RGB image capture device may also omit an IR cut filter, thereby allowing IR light to reach an RGB image sensor resulting in inaccurate color in images produced by the RGB image capture device.

BRIEF SUMMARY

In some examples, systems and techniques are described for processing images for correcting color based on data from multiple image sensors.

According to at least one example, a method is provided for processing images. The method includes: obtaining a first color image including first one or more pixels from a first image sensor; obtaining a second color image including second one or more pixels from a second image sensor, the second color image including infrared (IR) information from the second image sensor; determining a transformation between colors associated with the first one or more pixels and colors associated with the second one or more pixels based on a comparison associated with the first one or more pixels and the second one or more pixels; and generating a color corrected image at least in part by transforming the second color image including IR information to a color corrected image based on the determined transformation.

In another example, an apparatus for processing images is provided that includes a memory (e.g., configured to store data, such as virtual content data, one or more images, etc.) and one or more processors (e.g., implemented in circuitry) coupled to the memory. The one or more processors are configured to and can: obtain a first color image including first one or more pixels from a first image sensor; obtain a second color image including second one or more pixels from a second image sensor, the second color image including IR information from the second image sensor; determine a transformation between colors associated with the first one or more pixels and colors associated with the second one or more pixels based on a comparison associated with the first one or more pixels and the second one or more pixels; and generate a color corrected image at least in part by transform the second color image including IR information to a color corrected image based on the determined transformation.

In another example, a non-transitory computer-readable medium is provided that has stored thereon instructions that, when executed by one or more processors, cause the one or more processors to: obtain a first color image including first one or more pixels from a first image sensor; obtain a second color image including second one or more pixels from a second image sensor, the second color image including IR information from the second image sensor; determine a transformation between colors associated with the first one or more pixels and colors associated with the second one or more pixels based on a comparison associated with the first one or more pixels and the second one or more pixels; and generate a color corrected image at least in part by transform the second color image including IR information to a color corrected image based on the determined transformation.

In another example, an apparatus for processing images is provided. The apparatus includes: means for obtaining a first color image including first one or more pixels from a first image sensor; means for obtaining a second color image including second one or more pixels from a second image sensor, the second color image including IR information from the second image sensor; means for determining a transformation between colors associated with the first one or more pixels and colors associated with the second one or more pixels based on a comparison associated with the first one or more pixels and the second one or more pixels; means for generating a color corrected image at least in part by transforming the second color image including IR information to a color corrected image based on the determined transformation.

In some aspects, a field of view associated with the first one or more pixels at least partially overlaps with a field of view associated with the second one or more pixels.

In some aspects, the first image sensor is associated with a first optical axis, and the second image sensor is associated with a second optical axis, different from the first optical axis.

In some aspects, the first image sensor has a first resolution, and the second image sensor has a second resolution, different from the first resolution.

In some aspects, the first image sensor comprises a single pixel.

In some aspects, the first image sensor comprises a plurality of pixels.

In some aspects, an IR cut filter is disposed between a lens of the first image sensor and the first image sensor.

In some aspects, the method, apparatuses, and computer-readable medium described above further comprise: determining a first green statistical measure of the green components of the first one or more pixels and a second green statistical measure of the green components of the second one or more pixels; determining a first red statistical measure of the red components of the first one or more pixels and a second red statistical measure of the red components of the second one or more pixels; determining a first blue statistical measure of the blue components of the first one or more pixels and a second blue statistical measure of the blue components of the second one or more pixels; determining a green color correction based on a numerical correspondence of the first green statistical measure and the second green statistical measure; determining a red color correction based on a numerical correspondence of the first red statistical measure and the second red statistical measure; determining a blue color correction based on a numerical correspondence of the first blue statistical measure and the second blue statistical measure.

In some aspects, the method, apparatuses, and computer-readable medium described above further comprise: generating the color corrected image comprises applying the red color correction to the red components of each pixel of the second one or more pixels, applying the green color correction to the green components of each pixel of the second one or more pixels, and applying the blue color correction to the blue components of each pixel of the second one or more pixels.

In some aspects, the transformation between colors of the first one or more pixels and colors of the second one or more pixels comprises a color correction matrix.

In some aspects, the method, apparatuses, and computer-readable medium described above further comprise: generating the color corrected image comprises applying the determined transformation to the second one or more pixels to produce first color corrected pixels.

In some aspects, the method, apparatuses, and computer-readable medium described above further comprise: dividing one or more of the first color image and the second color image into a plurality of sections; determining a first section transformation associated with a first subset of the second one or more pixels associated; determining a second section transformation associated with a second subset of the second one or more pixels, wherein the second subset of the second one or more pixels differs from the first subset by at least one pixel.

In some aspects, the method, apparatuses, and computer-readable medium described above further comprise: determining a global transformation for generating the color corrected image based on the first section transformation and the second section transformation.

In some aspects, the method, apparatuses, and computer-readable medium described above further comprise: generating the color corrected image at least in part by transforming the first subset of the second one or more pixels by the first section transformation and transforming the second subset of the second one or more pixels by the second section transformation.

In some aspects, the first one or more pixels do not include IR information.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 6A through FIG. 6F are images illustrating operations of an image color correction system, in accordance with some examples;

DETAILED DESCRIPTION

Figure 1A:
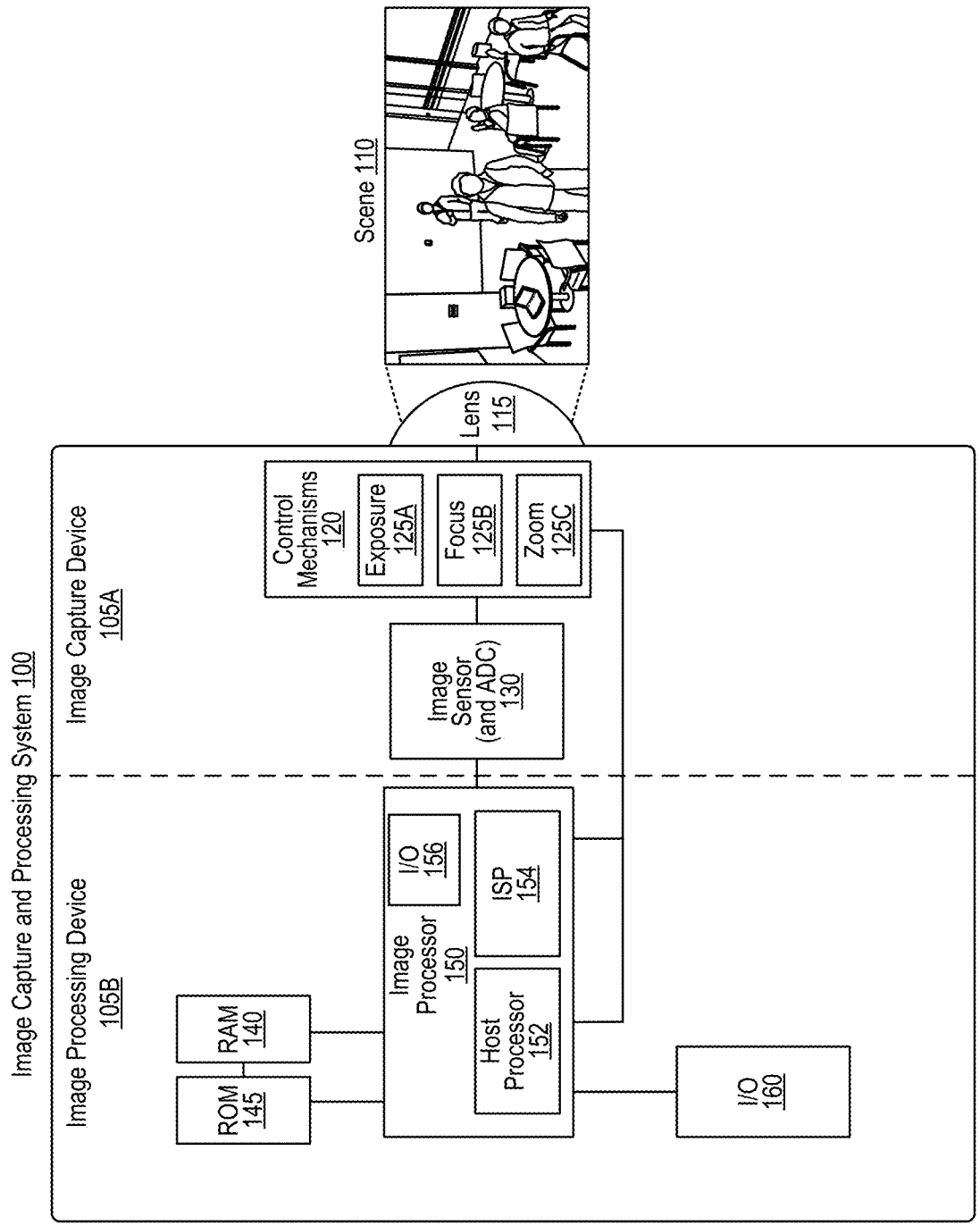
FIG. 1A is a block diagram illustrating an architecture of an image capture and processing device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Many image capture devices are configured to capture different portions of the electromagnetic spectrum (e.g., visible, infrared (IR), ultraviolet (UV), etc.). Devices that capture some or all of the visible spectrum are also be referred to as color image capture devices. Examples of color image capture devices include image capture devices that capture images including a red (R) component, a green (G) component, and a blue (B) component (collectively RGB) per pixel, image capture devices that capture images including luma, chroma-blue, and chroma-red (YUV, YCbCr, Y'CbCr, etc.) components per pixel, etc. For instance, RGB image capture devices utilize color filters to separate incoming light into different color light components. In one example, a Bayer color filter can filter incoming light into RGB light components and RGB photodiodes can capture corresponding RGB light to produce RGB signal values for each pixel in the sensor of the image capture device.

In some cases, the color filters used in RGB image capture devices can be partially transparent to IR light, which can be present in both sunlit environments as well as artificially lit environments (e.g., from incandescent light bulbs). In some aspects, IR light that reaches the RGB photodiodes can skew the color output produced by an RGB image capture device. In some cases, IR light can affect each of the R, G, and B signal values differently. For example, a higher percentage of IR light may pass through R filters when compared to G filters. In some cases, the effect of the IR light may also differ in different regions of the image sensor of the RGB imaging device. For example, in some cases, more IR light may pass through RGB filters close to the edges of an image sensor when compared to the amount of IR light passing through RGB filters near the center of an image sensor. In such cases, the resulting color output of the RGB image sensor can be accurate to different degrees in different regions of a captured RGB image. In some cases, an IR light filter (also referred to as an IR cut filter) can be placed in front of a color image sensor to filter out IR light and prevent the IR light from reaching the color image sensor.

Devices that capture some or all of the IR spectrum can also be referred to as IR image capture devices herein. In some cases, IR image capture devices can include at least a portion of an image sensor that is sensitive to IR light and does not include an IR cut filter filtering IR light from at least the IR sensitive portion of the image sensor. In some cases, an IR cut filter can be implemented as a global element that either completely covers an image sensor or is not present.

Some devices can be configured to capture both color and IR signal information, and are referred to as RGB and IR image capture devices or RGBIR image capture devices herein. For example, an image sensor included in an RGBIR image capture device may detect RGB and IR light components and an image produced by the RGBIR image capture device can include RGB and IR signal components. In some implementations, an RGBIR image capture device may not include an IR cut filter in front of the RGBIR image sensor and as a result produce inaccurate color in some lighting conditions. In some implementations, an RGBIR image capture device may include an RGB image sensor and an RGBIR image sensor with similar or the same resolution. In some examples, the RGB image capture device can include an IR cut filter in front of the RGB image sensor (e.g., between the lens and the image sensor). In some cases, the RGBIR image capture device can switch between the RGB image sensor and RGBIR image sensor depending on lighting conditions and/or split the incoming light (e.g., using a prism) so that appropriate portions of the light spectrum reach each image sensor. In some aspects, the RGBIR image capture device (e.g., a security camera) may include a mechanical arm or other mechanism that moves an IR cut filter away from the image sensor when IR light is present (e.g., under low light conditions when an IR illumination source is used) and moves the IR cut filter in front of the image sensor under well-lit or ambient light conditions. In some cases, an image sensor (e.g., a main image sensor) included in an RGBIR image capture device with a mechanism to move an IR cut filter can be an RGB image sensor (e.g., including R photodiodes, G photodiodes, and B photodiodes). In some cases, because IR light is allowed to reach the RGB image sensor, the resulting color images produced by the RGBIR sensor can be inaccurate.

Each of the RGBIR image capture device solutions described above can increase the weight, size, cost and/or power consumption of an RGBIR image capture device and/or produce an image with a poor color reproduction quality. Accordingly, systems and techniques for accurately and efficiently producing color images using an RGBIR sensor are needed.

Systems and techniques are needed for accurately and more efficiently obtaining accurate color information from an RGBIR image capture device. For example, many applications may benefit from the ability to detect IR light (e.g., capturing image in low light conditions), but may suffer from inaccurate color reproduction. By correct the color in images produced by an RGBIR image capture device, the systems and techniques can allow an RGBIR image capture device to provide both IR sensitivity and accurate color reproduction.

Systems, apparatuses, processes (also referred to as methods), and computer-readable media (collectively referred to as "systems and techniques") are described herein for producing accurate color images based on images captured by multiple image capture devices. For example, the systems and techniques can be used with RGBIR image sensors to produce accurate color information in lighting conditions that include IR light (e.g., sunlight, incandescent lightbulb illumination, or the like). The systems and techniques allow an RGBIR image capture device to capture an RGBIR image with an RGBIR sensor (or an RGBIR subset of pixels within a sensor) without an IR cut filter. The systems and techniques can also allow the RGBIR image capture device to capture an RGB image with IR light filtered out (e.g., by an IR cut filter) using a reference sensor (or a RGB reference subset of pixels within a sensor). The RGBIR sensor and the reference sensor have at least partially overlapping fields of view (e.g., the pixels of the main sensor and the pixels of the reference sensor can capture at least partially overlapping scenes). Although the examples described herein will be discussed in terms of an RGBIR sensor and an RGB reference sensor, it should be understood that a single sensor with different pixel regions can be used to capture an RGBIR image and an IR filtered RGB color image without departing from the scope of the present disclosure. In addition, although many of the examples described herein describe color correction in terms of RGB color representation, the systems and techniques of the present disclosure can be used with any other color representations, such as luma, chroma-blue, chroma-red (YCbCr or Y'CbCr) images; and/or any color representation. In some cases, the systems and techniques herein can also be used to correct monochromatic images that are affected by unwanted illumination (e.g., IR).

Various aspects of the techniques described herein will be discussed below with respect to the figures. FIG. 1A is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the image capture and processing system 100 faces a scene 110 and receives light from the scene 110. In some cases, the lens 115 and image sensor 130 can be associated with an optical axis. In one illustrative example, the photosensitive area of the image sensor 130 (e.g., the photodiodes) and the lens 115 can both be centered on the optical axis. The lens 115 bends incoming light from the scene 110 toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom setting by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Figure 2A:
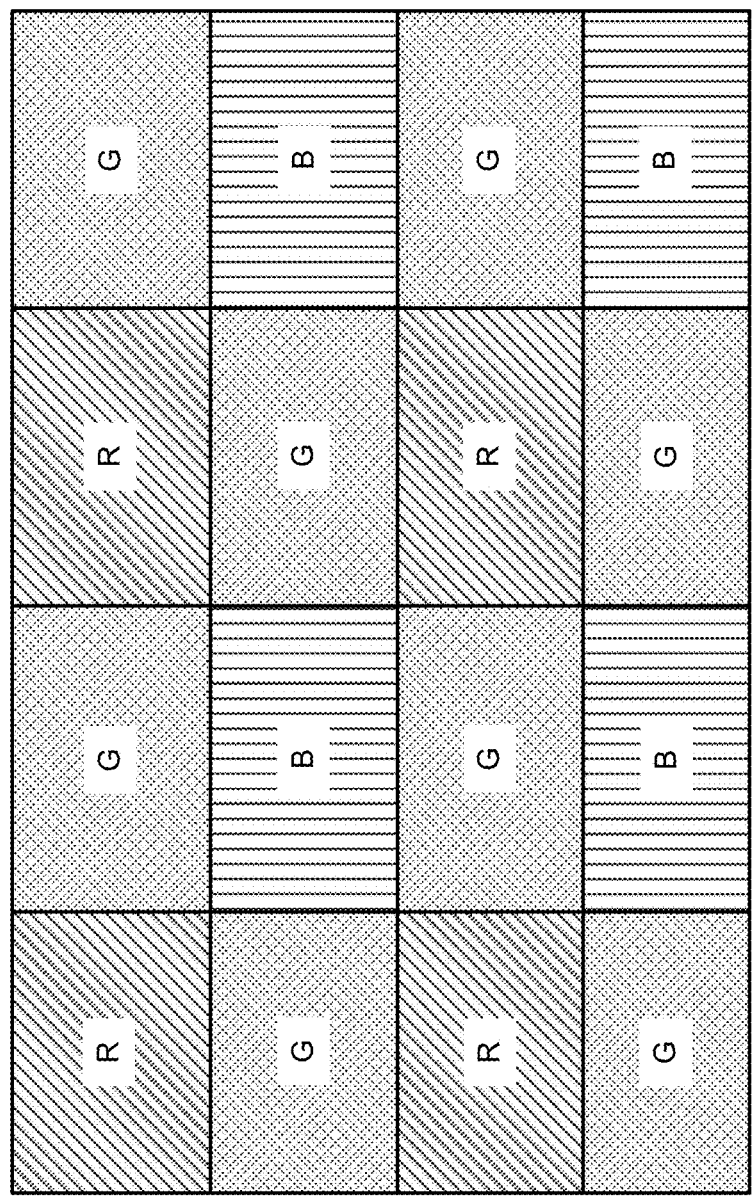
FIG. 2A and FIG. 2B are diagrams illustrating example Red, Green, and Blue (RGB) color filter arrays, in according with some examples.
Figure 2B:
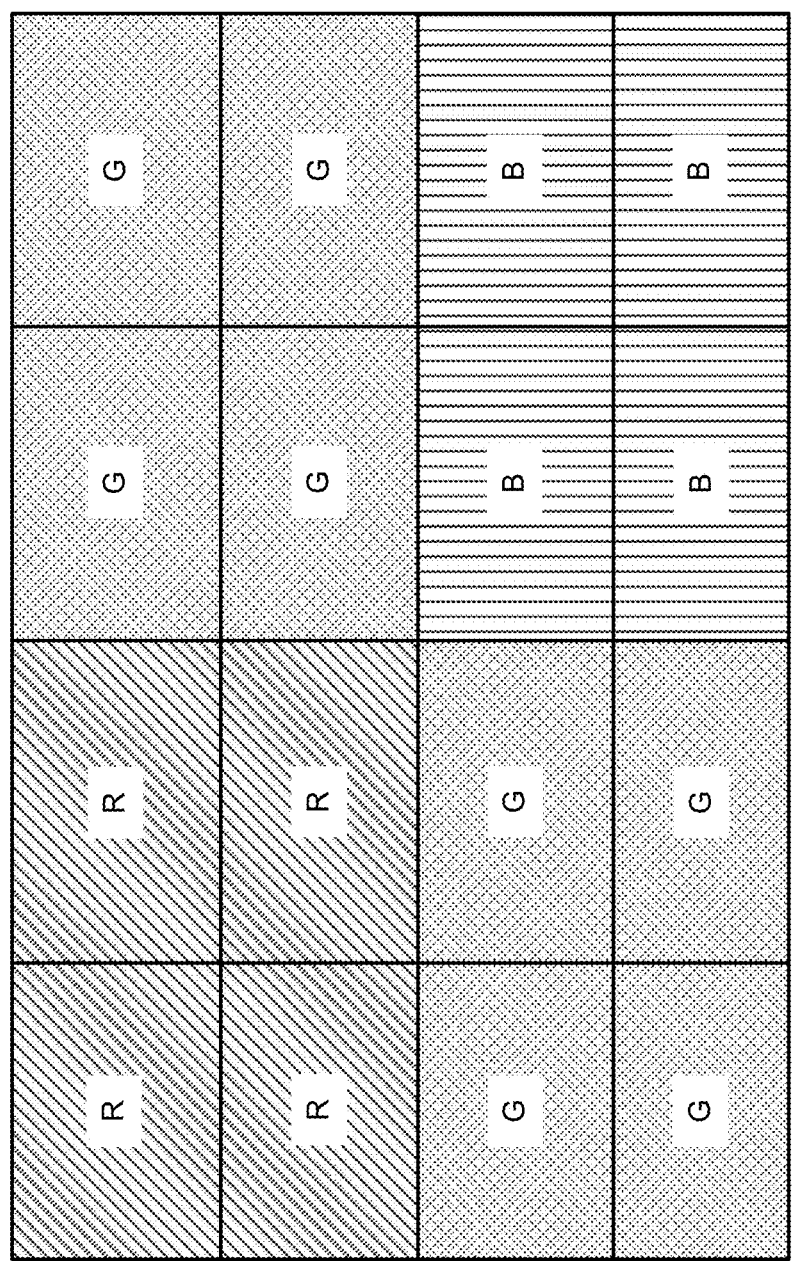

An example of a Bayer color filter array 200 is shown in FIG. 2A. As illustrated in FIG. 2A, the Bayer color filter array 200 includes a repeating pattern of R color filters, B color filters, and G color filters. FIG. 2B illustrates an example quad color filter array (QCFA) 220. As shown, QCFA 220 includes a 2×2 (or "quad") pattern of color filters, including a 2×2 pattern of red (R) color filters, a pair of 2×2 patterns of green (G) color filters, and a 2×2 pattern of blue (B) color filters. The pattern of the Bayer color filter array 200 shown in FIG. 2A, the pattern of the QCFA 220 shown in FIG. 2B, any other color filter, or any combination thereof can be repeated for the entire array of photodiodes of a given image sensor 130.

Returning to FIG. 1A, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., RGB or other color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked).

Figure 2C:
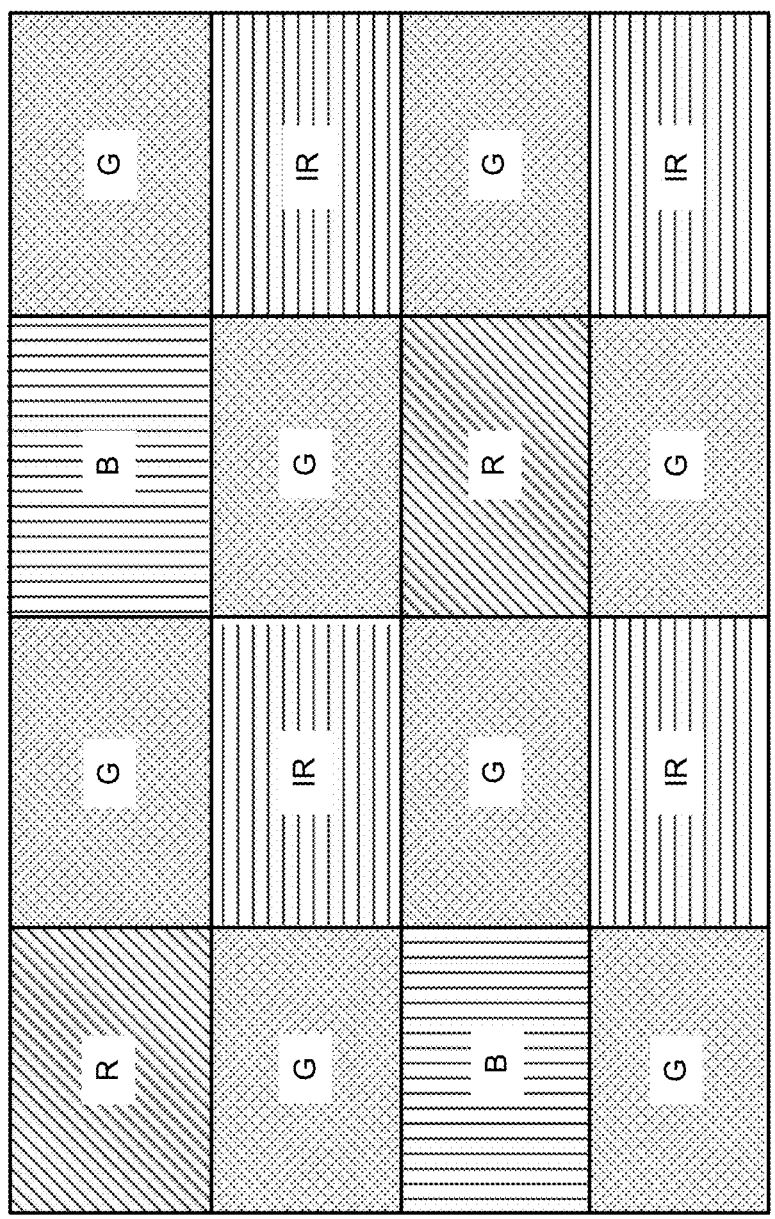
FIG. 2C and FIG. 2D are diagrams illustrating example RGB plus infrared (RGBIR) filter arrays, in accordance with some examples.
Figure 2D:
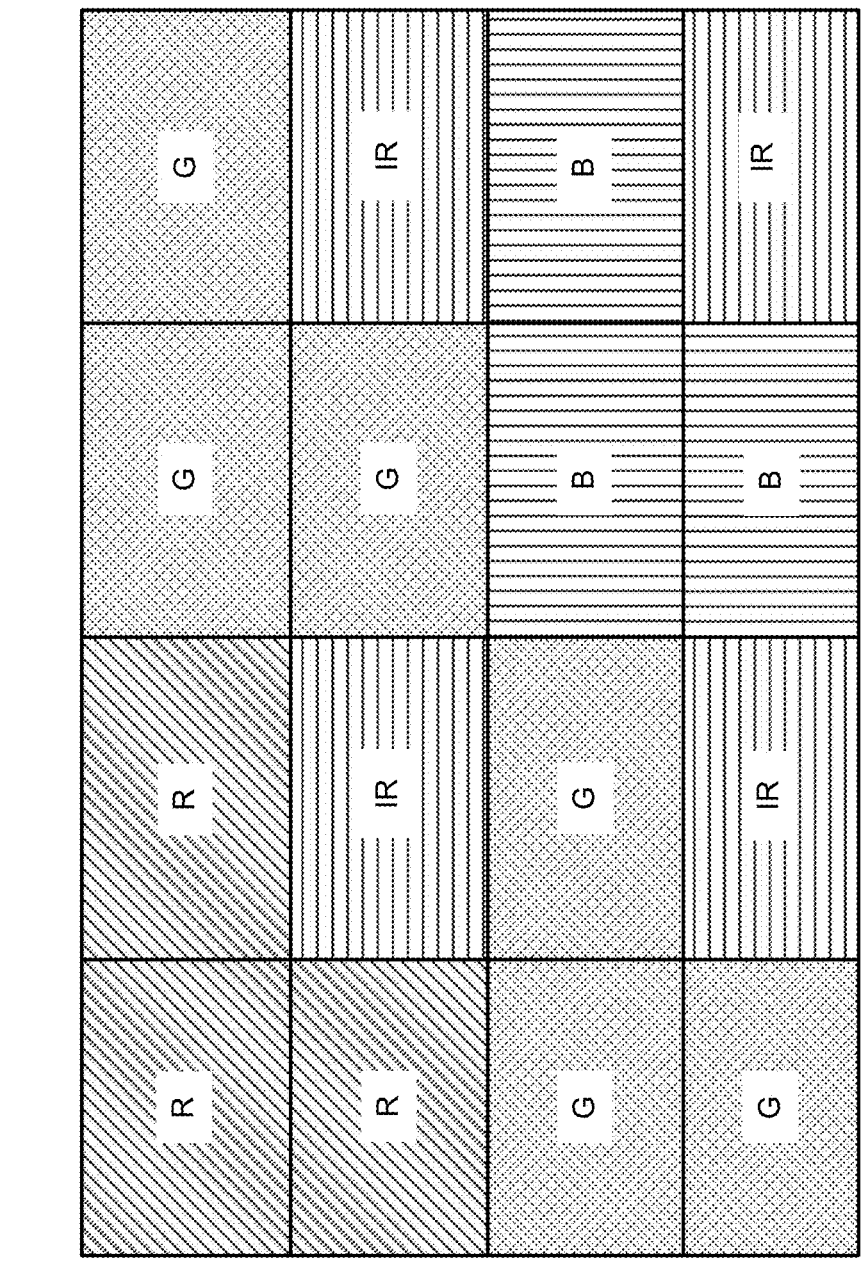

FIG. 2C illustrates an example RGBIR filter 240 that incorporates IR photodiodes in addition to the R, G, B colors shown in the Bayer color filter array 200 of FIG. 2A and QCFA 220 of FIG. 2B. Similarly, FIG. 2D illustrates another example RGBIR filter 260 Similar to the QCFA 220 of FIG. 2B, replacing one photodiode of each RGB quad of the QCFA 220 to operate as an IR photodiode. In some cases, in addition or as an alternative to the use of filters, different photodiodes throughout the pixel array can have different spectral sensitivity curves, therefore responding to different wavelengths of light. Monochrome image sensors may lack filters and therefore lack color depth.

Returning to FIG. 1A, In some cases, the image sensor 130 may alternately or additionally include opaque and/or reflective masks that block light from reaching certain photodiodes, or portions of certain photodiodes, at certain times and/or from certain angles. In some cases, the opaque and/or reflective masks may be used for phase detection autofocus (PDAF). In some cases, opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output by the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 10:
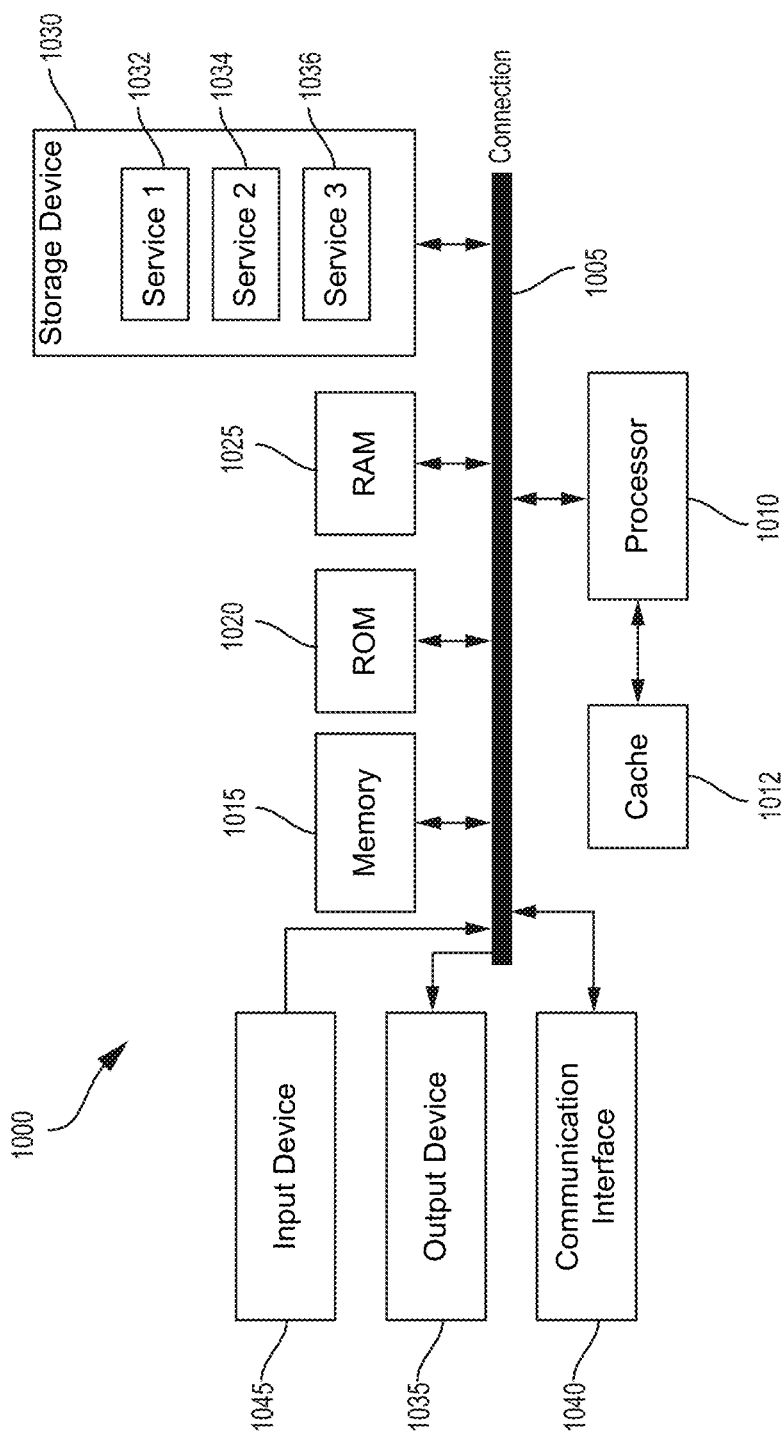
FIG. 10 is a diagram illustrating an example of a computing system for implementing certain aspects described herein.

The image processor 150 may include one or more processors, such as one or more image signal processors (ISPs) (including ISP 154), one or more host processors (including host processor 152), and/or one or more of any other type of processor 1010 discussed with respect to the computing system 1000 of FIG. 10. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

Figure 1B:
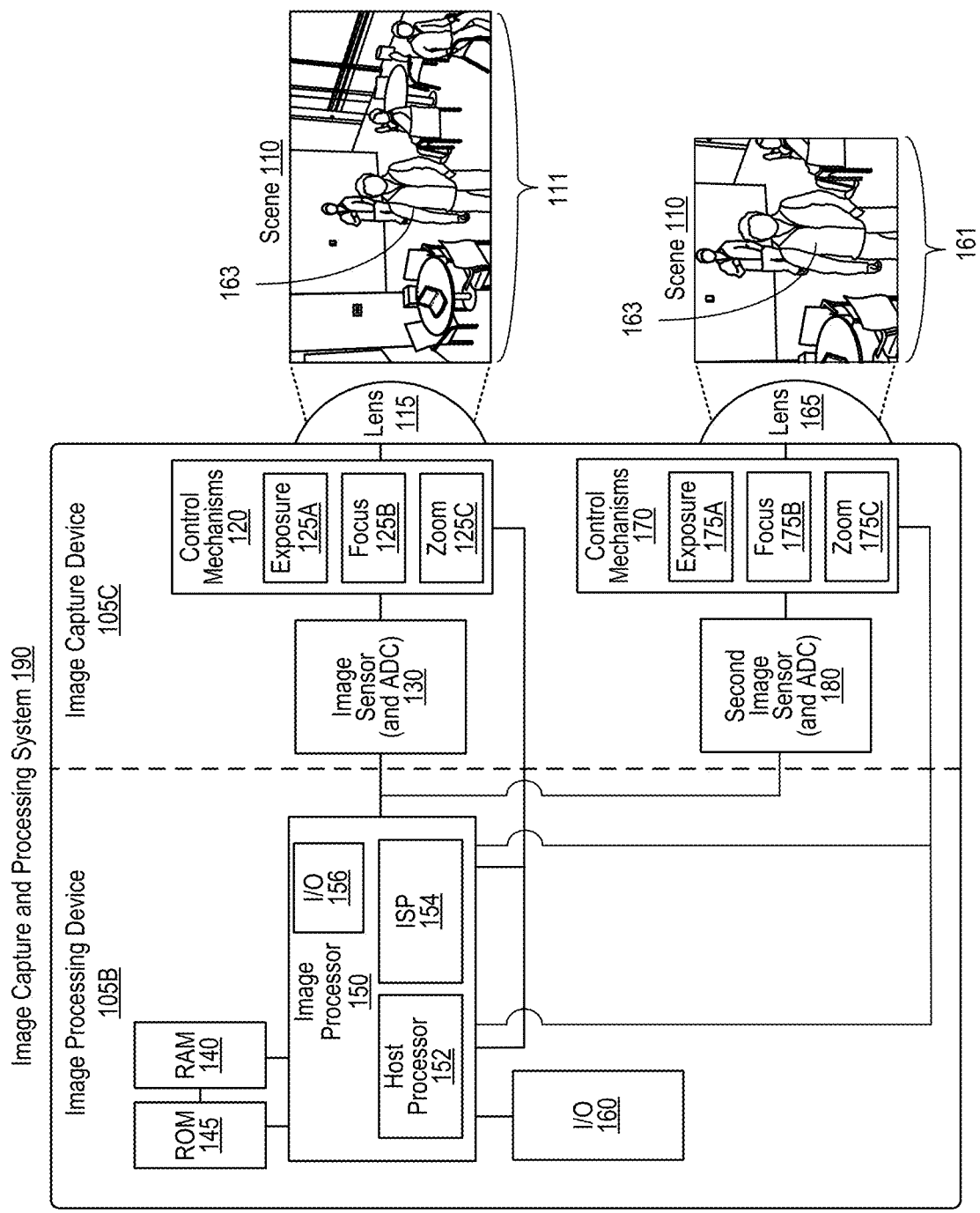
FIG. 1B is a block diagram illustrating an additional architecture of an image capture and processing device in accordance with some examples.

As shown in FIG. 1A, a vertical dashed line divides the image capture and processing system 100 of FIG. 1A into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A. Second image sensor FIG. 1B illustrates another example of an image capture and processing system 190 including the image processing device 105B of FIG. 1B and an image capture device 105C. In the illustrated example, image capture device 105C includes image sensor 130 and control mechanisms 120 described above with respect to FIG. 1A, as well as a second image sensor 180 and control mechanisms 170. The control mechanisms 170 can be similar to and perform similar functions to control mechanisms 120 of FIG. 1A. Exposure control mechanism 175A can be similar to and perform similar functions to exposure control mechanism 125A of FIG. 1A. Focus control mechanism 175B can be similar to and perform similar functions to focus control mechanism 125B of FIG. 1A. Zoom control mechanism 175C can be similar to and perform similar functions to zoom control mechanism 125C.

In some cases, the first image sensor 130 and second image sensor 180 and corresponding lenses 115, 165 of image capture device 105C can have an at least a partially overlapping field of view. As noted above, image sensor 130 and lens 115 can be associated with an optical axis, also referred to as the first optical axis herein. In some examples, the lens 165 and second image sensor can be associated with a second optical axis. In one illustrative example, a photosensitive area of the second image sensor 180 (e.g., the photodiodes) and the lens 165 can be centered on the second optical axis. Other alignments between the image sensor 130 and lens 115 and the second image sensor 180 and lens 165 can be used without departing from the scope of the present disclosure. In some cases, the first optical axis and second optical axis can be physically close together (e.g., multiple cameras of an electronic device). In the illustrated example, the lens 165 can be a different type of lens than lens 115. For example, as illustrated in FIG. 1B, the lens 115 can have a wide field of view 111 (e.g., from a wide-angle lens). In some cases, the lens 165 can have a narrower field of view 161 (e.g., from a telephoto lens) with a higher magnification or zoom factor (as illustrated by the relatively larger size of person 163) than the lens 115. In some cases, one of the image sensor 130 and the second image sensor 180 can be an RGB image sensor and the other of the image sensor 130 and the second image sensor 180 can be an RGBIR sensor. In some cases, color information in an image captured by the RGB image sensor can be used to correct color in an image captured by the RGBIR image sensor.

The image capture and processing systems 100 and/or 190 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing systems 100 and/or 190 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A and/or image capture device 105C can include a camera device and the image processing device 105B can include a computing device, such as a mobile handset, a desktop computer, or other computing device.

While the image capture and processing system 100 and image capture and processing system 190 are shown to include certain components, one of ordinary skill will appreciate that the image capture and processing system 100 and/or image capture and processing system 190 can include more components than those shown in FIG. 1A and FIG. 1B. The components of the image capture and processing systems 100 and/or image capture and processing system 190 can include software, hardware, or one or more combinations of software and hardware. For example, in some implementations, the components of the image capture and processing system 100 and/or image capture and processing system 190 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100 and/or image capture and processing system 190.

Figure 3B:
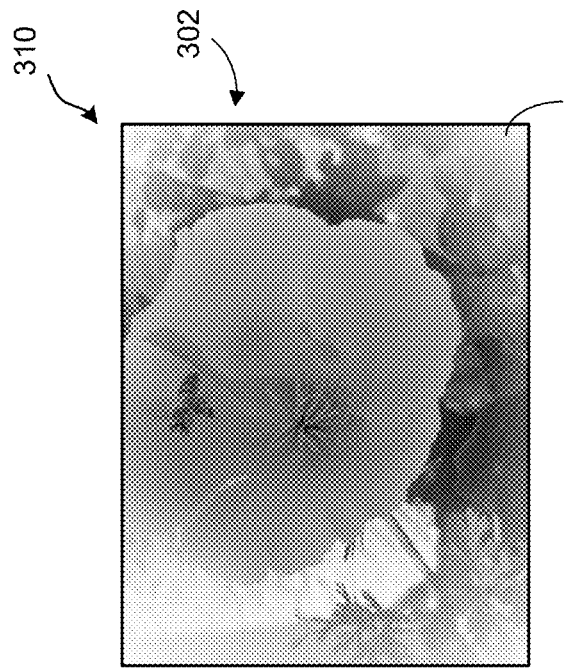
FIG. 3B is an example image of the same scene captured in FIG. 3A captured by an RGBIR image sensor, in accordance with some examples.
Figure 3A:
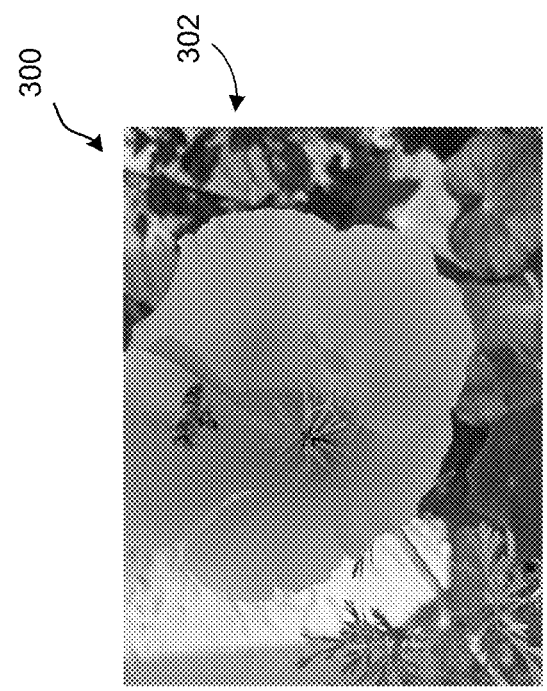
FIG. 3A is an example image of a scene captured by an RGB image sensor, in accordance with some examples.

FIG. 3A and FIG. 3B are images that provide illustrative examples of differences in images captured by an RGB image sensor and an RGBIR image sensor in the presence of IR illumination. FIG. 3A is an example RGB image 300 of a scene 302 captured by an RGB image sensor. For example, RGB image 300 may have been captured with an image sensor incorporating the Bayer color filter array 200 of FIG. 2A or QCFA of FIG. 2B. In some cases, the R, G, and B filters of a Bayer color filter array, QCFA, or other color filter pattern may not completely block IR light from reaching the R, G, and B photodiodes of an RGB image sensor. In some examples, each of the R, G, and B photodiodes of an RGB image sensor may be sensitive to IR light. In some implementations, when IR light is captured by the camera (e.g., in sunlight), then a portion of the signal produced by each of the R, G, and B photodiodes of an RGB image sensor can also include a signal portion caused by the IR light, which can cause the resulting image to include inaccurate representation of color in the captured scene. In some cases, an IR cut filter can be placed between the scene and the RGB image sensor (e.g., between lens 115 and image sensor 130 shown in FIG. 1A). In some aspects, an IR cut filter can allow color light to pass through, while blocking IR light from passing. In some examples, IR light may be prevented from reaching the R, G, and B pixels. In some cases, as a result of IR spectral components being blocked by an IR cut filter, images produced by an image sensor blocked by an IR cut sensor can accurately capture color information from a scene.

FIG. 3B illustrates an example RGBIR image 304 of the scene 302 captured in RGB image 300 of FIG. 3A. In some cases, the RGBIR image 304 can be captured by an image sensor that does not include an IR cut filter placed in front of the photodiode array (e.g., in an RGBIR image capture device). As a result IR light being incident on the RGB photodiodes (e.g., photodiodes behind RGB color filters) may also detect a portion of IR light erroneously as R, G, and/or B light. In some cases, the IR light can increase the overall signal level of all of the RGB photodiodes. In some cases, the amount that the IR light raises the signal level of the RGB photodiodes may not be uniform. For example, the R, G, and B photodiodes may each have different sensitivity to the IR light. As a result, the amount of increase in the signal level resulting from the IR light may also differ between the R, G, and B photodiodes. This unequal effect on the different colored RGB photodiodes can result in a distortion of the true color represented in the scene. In some aspects, any difference in RGB image values (e.g., the representation of color in an image) resulting from IR light not being blocked by an IR cut filter in an RGBIR image can result in a skewed color representation when compared to an image captured by an image sensor blocked by an IR cut filter. In addition, because the amount of IR light incident on each photodiode is not known, color correction and/or white balance correction processing functions of an image capture device may not be able to compensate for the unknown amount of IR light to produce a correct color output. In one illustrative example, haze 312 can be a result of IR light being detected by RGB photodiodes. In some cases, haze 312 can appear white, or the haze 312 can appear as any other color. In another illustrative example, the IR light can cause a color cast (not shown) on the RGBIR image 304. For example, a color cast can appear in RGBIR image 304 as a red, green, or blue tint. In some cases, if the R photodiodes are more sensitive to light (e.g., because the R color filter allows more IR to pass through than the G and B color filters), then the haze 312 may have a red appearance. In additional or alternatively to differences in the effect on different colors of RGB photodiodes, the effect of IR may also be spatially non-uniform. In some cases, the amount of IR light sensed by the RGB photodiodes may be greater at the edges of the image sensor than at the center of the image sensor. The amount of light sensed by individual RGB photodiodes can determine the amount of color skew for each individual RGB photodiode.

As described above with respect to FIG. 1B, in some cases, an image capture system (e.g., image capture and processing system 100 and/or image capture and processing system 190) can include multiple image sensors that share at least a partially overlapping field of view. In some cases, at least one of the multiple image sensors can include an IR cut filter for blocking out IR light (e.g., an RGB sensor). In some cases, the colors captured by the RGB sensor can be presumed to be accurate. As discussed in more detail herein, in some cases, the color information captured by the RGB sensor can be used to correct colors for other images sensors included in the multiple image sensors.

Figure 4:
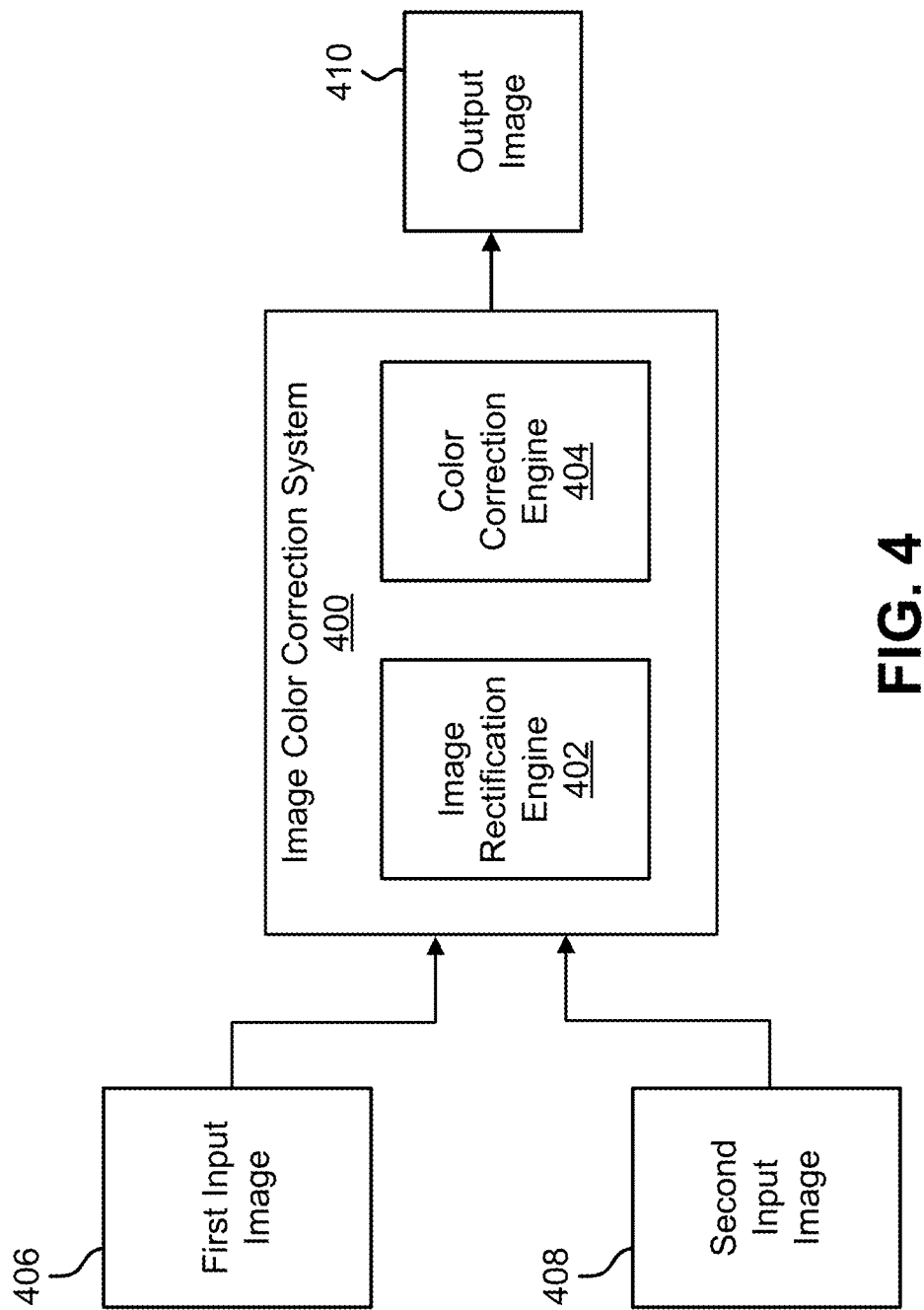
FIG. 4 is a diagram illustrating components of an image color correction system, in accordance with some examples.

FIG. 4 illustrates an example of an image color correction system 400. The image color correction system 400 includes various component that are used to process images and correct perform color correction. As shown, the components of the image color correction system 400 include an image rectification engine 402, and a color correction engine 404.

The image color correction system 400 can include or be part of a multi-imager system. For example, the image color correction system 400 can include or be part of image capture and processing system 100 of FIG. 1A and/or image capture and processing system 190 of FIG. 1B. In other implementations, image color correction system 400 can be part of a mobile or stationary telephone handset (e.g., smartphone, cellular telephone, or the like), a server computer (e.g., in communication with a vehicle computing system), a desktop computer, a laptop or notebook computer, a tablet computer, a set-top box, a television, a camera, a display device, a digital media player, a video streaming device, or any other suitable electronic device. In some examples, image color correction system 400 can include one or more wireless transceivers (or separate wireless receivers and transmitters) for wireless communications, such as cellular network communications, 802.11 Wi-Fi communications, wireless local area network (WLAN) communications, Bluetooth or other short-range communications, any combination thereof, and/or other communications. In some implementations, the components of the image color correction system 400 (e.g., image rectification engine 402 and color correction engine 404) can be part of the same computing device. In some implementations, the components of the image color correction system 400 can be part of two or more separate computing devices. In some cases, the image color correction system 400 can be implemented as part of the computing system 1000 shown in FIG. 10.

While the image color correction system 400 is shown to include certain components, one of ordinary skill will appreciate that the image color correction system 400 can include more components or fewer components than those shown in FIG. 4. In some cases, additional components of the image color correction system 400 can include software, hardware, or one or more combinations of software and hardware. For example, in some cases, the image color correction system 400 can include one or more other sensors (e.g., one or more inertial measurement units (IMUs), radars, light detection and ranging (LIDAR) sensors, audio sensors, etc.), one or more display devices, one or more other processing engines, one or more other hardware components, and/or one or more other software and/or hardware components that are not shown in FIG. 4. In some implementations, additional components of the image color correction system 400 can include and/or can be implemented using electronic circuits or other electronic hardware, which can include one or more programmable electronic circuits (e.g., digital signal processors (DSPs), microprocessors, microcontrollers, graphics processing units (GPUs), central processing units (CPUs), any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image color correction system 400.

Image rectification engine 402 can be used to prepare the first input image 406 and the second input image 408 for color correction by the color correction engine 404. For example, the image adjustment engine may be used to align the first input image and the second input image, perform resolution upscaling and/or downscaling, and/or perform any other adjustment prior to color correction of the first input image based 406 on the second input image 408. One illustrative example of adjustments that can be performed by the image rectification engine 402 will be discussed in more detail with respect to FIG. 5 below.

Figure 5:
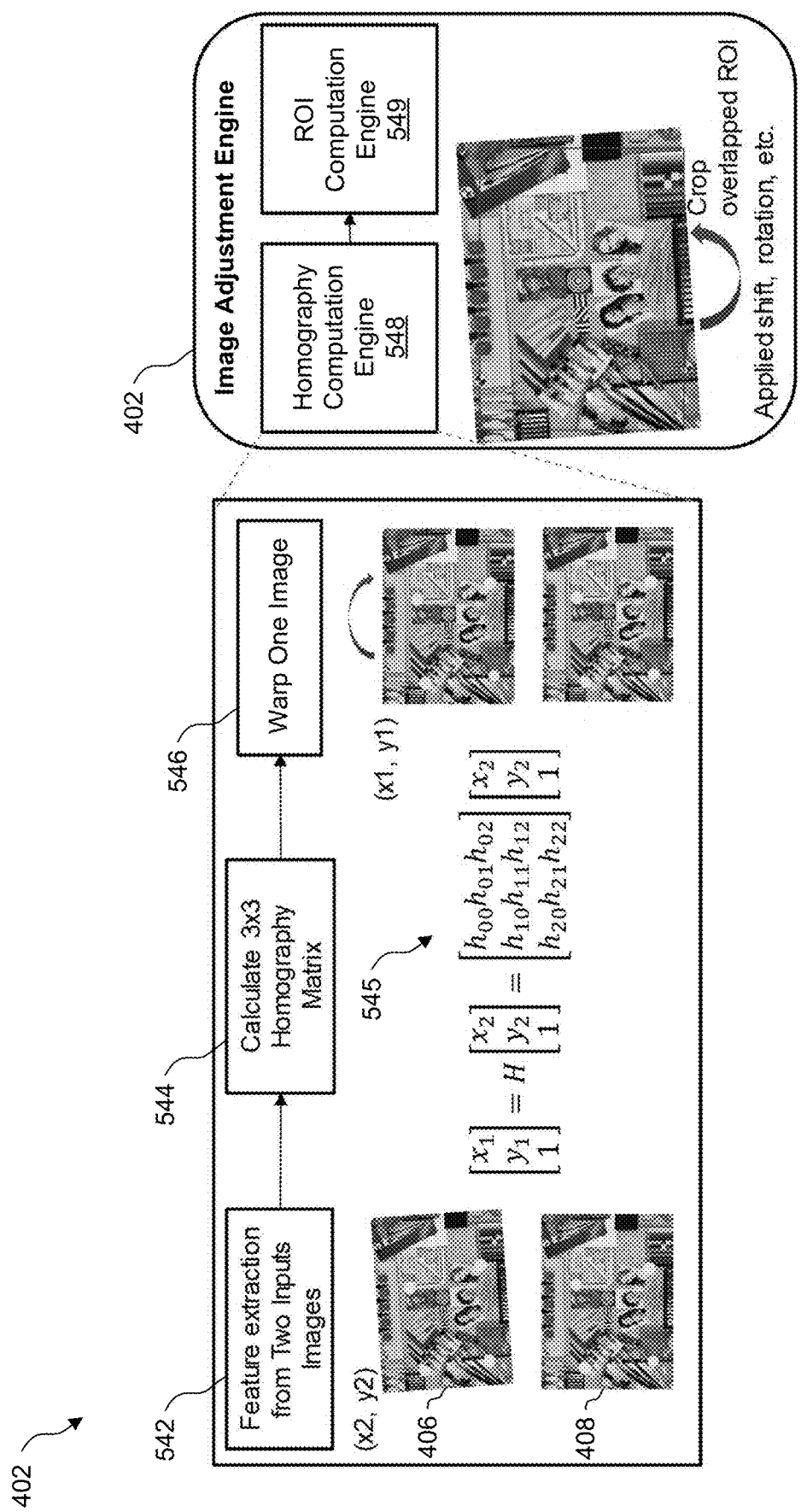
FIG. 5 is a diagram illustrating components of an image adjustment engine, in accordance with some examples.
Figure 6A:
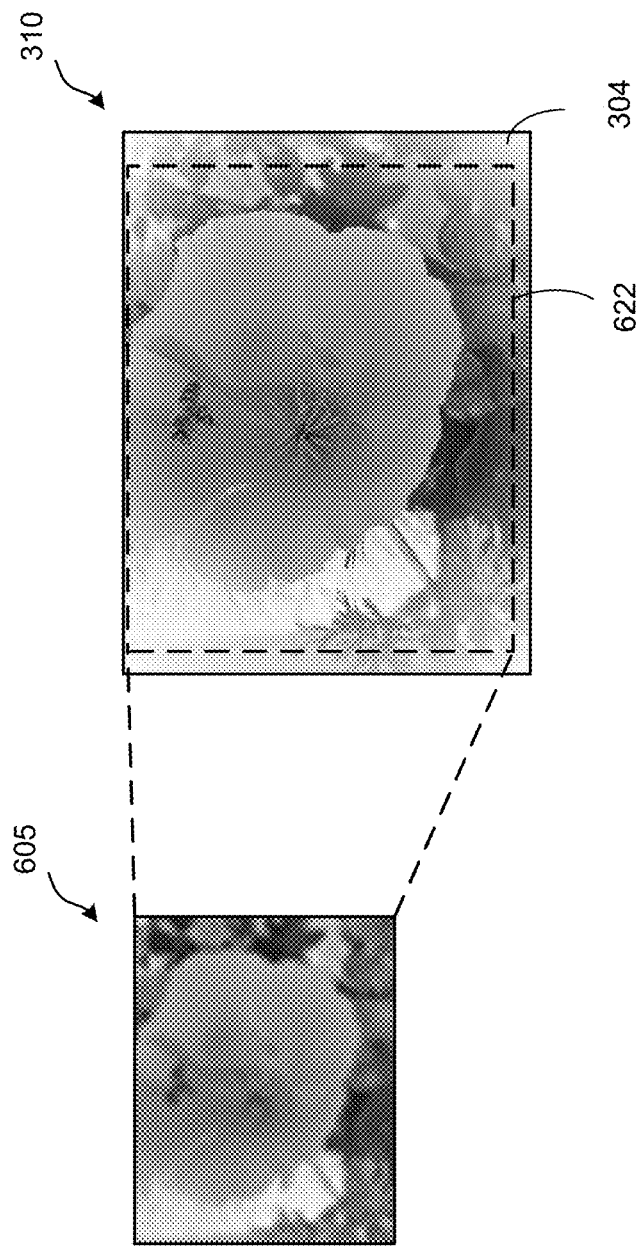

FIG. 5 is a diagram illustrating example components of and operation of the image rectification engine 402. As shown in FIG. 5, the image rectification engine 402 includes a homography computation engine 548 and a region of interest (ROI) computation engine 549. In some cases, the first input image 406 and the second input image 408 may have different resolutions. For example, the first input image 406 (e.g., RGBIR image 310 in FIG. 6A) may have a higher resolution than the second input image 408 (e.g., RGB image 605 in FIG. 6A). In some cases, the first input image 406 and second input image 408 can have different resolutions. For example, one of the first input image 406 and second input image 408 can have a higher resolution and the other of the first and second input images 406, 408 can have a lower resolution. In some cases, before aligning the first input image 406 and second input image 408, if the first input image 406 and second input image 408 do not share a common resolution, the image rectification engine 402 can either downsample the higher resolution image to the lower resolution or can upsample the lower resolution image to match the higher resolution. Any suitable downsampling or upsampling technique can be used, such as linear interpolation techniques. In some cases, the first input image 406 and the second input image 408 can have a common resolution. For the purposes of the ensuing description, the first input image 406 and the second input image 408 are treated as having a common resolution. For example, the RGBIR image 310 of FIG. 6B can correspond to the first input image 406, and the RGB image 615 of FIG. 6B can correspond to the second input image 408.

The homography computation engine 548 can perform operations 542, 544, and 546. For example, at operation 542, the homography computation engine 548 performs feature extraction from the two input images, including the first input image 406 and the second input image 408. The feature extraction can be performed using one or more feature detection and/or recognition algorithms to extract certain distinct features from the input images 406 and 408. The extracted features can be used as reference points by which to align the input images 406 and 408. In one illustrative example, if the input images 406 and 408 include images of a table, the extracted features can include the four corners of the table. The feature points on the four corners of the table in the first input image 406 can be aligned with the feature points on the four corners of the table in the second input image 408.

In some implementations, the feature detection and/or recognition algorithms used for operation 542 can include and/or incorporate an image detection and/or recognition algorithm, a feature detection and/or recognition algorithm, an edge detection algorithm, a boundary tracing function, an object detection and/or recognition algorithm, a facial detection and/or recognition algorithm. or some combination thereof. Feature detection is a technology used to detect (or locate) features of objects from an image or video frame. For instance, feature detection can identify a number of edges and corners in an area of the scene. In some implementations, one or more computer vision-based feature extraction technique can be used, such as using Histogram of oriented gradients (HOG), Speeded-up robust features (SURF), Local binary patterns (LBP), Haar wavelets, Color histograms, any combination thereof, and/or other computer vision techniques. In some implementations, the feature detection and/or recognition algorithm can be based on a machine learning model trained to extract features from images. For instance, the machine learning model can be a neural network (NN), such as a convolutional neural network (CNN), a time delay neural network (TDNN), a deep feed forward neural network (DFFNN), a recurrent neural network (RNN), an auto encoder (AE), a variation AE (VAE), a denoising AE (DAE), a sparse AE (SAE), a markov chain (MC), a perceptron, or some combination thereof. The machine learning model may be trained using supervised learning techniques, unsupervised learning techniques, semi-supervised learning techniques, any combination thereof, Generative adversarial network (GAN) training techniques, and/or other machine learning training techniques.

As shown in FIG. 5, four corresponding detected features are determined from the two input images 406 and 408 (shown in FIG. 5 as dots or points in the input images 406 and 408). At operation 544, the homography computation engine 548 calculates a homography matrix. For example, the homography computation engine 548 can determine a homography transform represented as a transform matrix (e.g., the 3×3 homography matrix 545) between the planes of the two input images 406 and 408. A 3×3 homography matrix 545 is shown in FIG. 5 as an illustrative example. Other homography matrix sizes can be used in other examples.

At operation 546, one of the input images (either the first input image 406 or the second input image 408 of FIG. 4) is warped based on the calculated transform matrix (e.g., the 3×3 homography matrix 545). For instance, using the homography matrix 545 (or transform), the features of the first input image 406 and the features of the second input image 408 can be registered with one another. Referring to FIG. 5, after applying the homography matrix based alignment, the four dots or points shown over the input images 406 and 408 can be overlapped with one another. In the illustrated example, each pixel of the first input image 406 is scaled and rotated to align with the second input image 408. The example shown in FIG. 5 illustrates the first input image 406 being scaled and rotated using the homography matrix 545 so that coordinates of a feature point are changed from a position of (x2, y2) (representing a (horizontal coordinate, vertical coordinate)) to a position of (x1, y1). It should be understood that either one of the two inputs images can be scaled and rotated to align with the other of the two input images without departing from the scope of the present disclosure.

In some cases, because the image content of one of the input images 406 or 408 is warped (to register the points of the input images 406 and 408, the image boundaries of the input images 406 and 408 after rotation may not be aligned. In some cases, as mentioned above, the input images 406 and 408 may also have different aspect ratios (e.g., wide angle vs. telephoto). In some implementations, the ROI computation engine 549 can cut or crop (referred to as image cropping) the overlapped image content and can use the overlapped portion as new output images that will be provided for processing by the color correction engine 404 of FIG. 4.

Figure 6B:
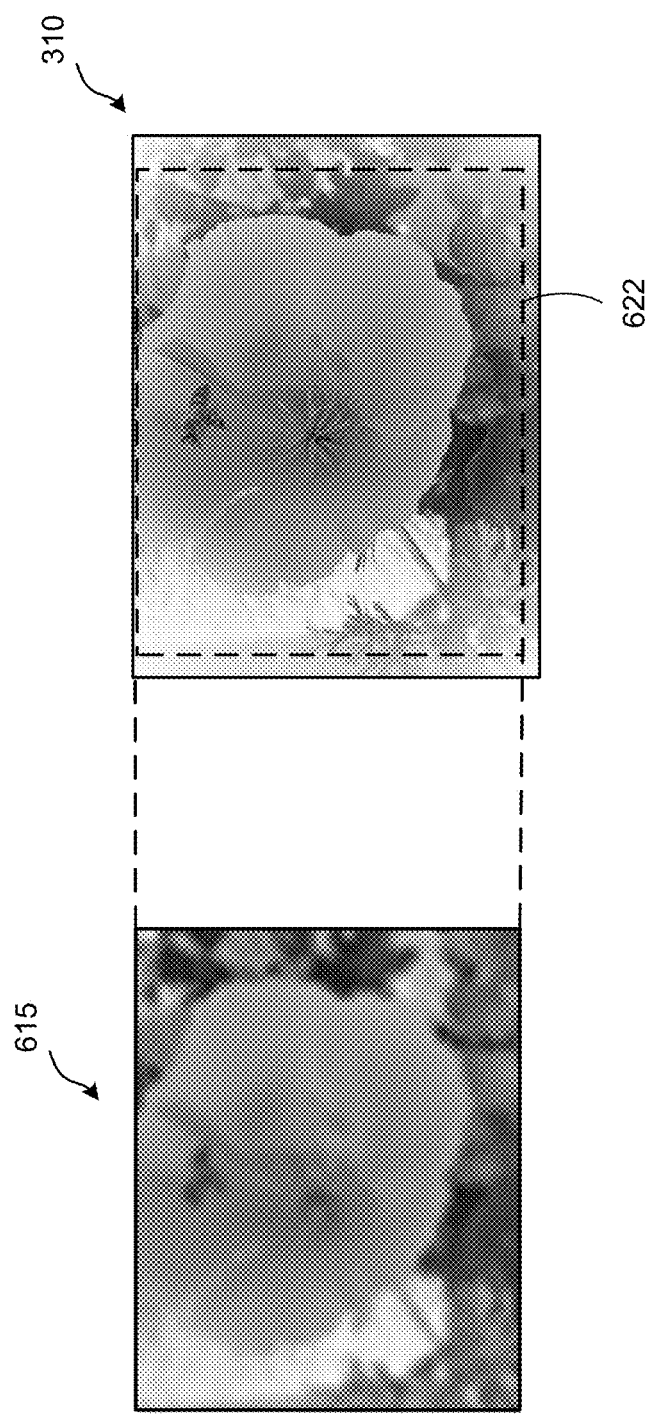
Figure 6C:
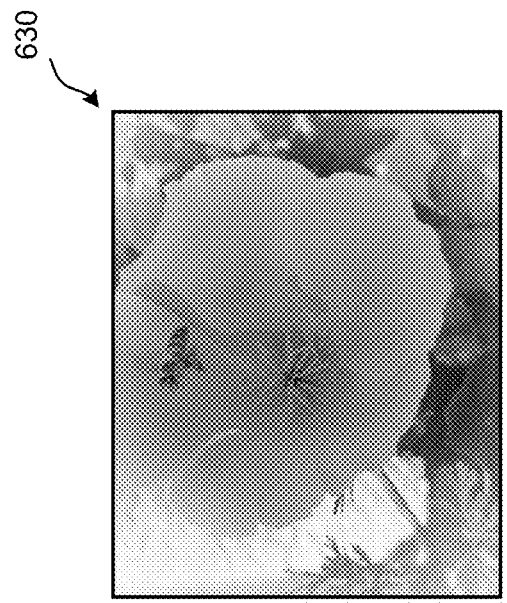
Figure 6C:
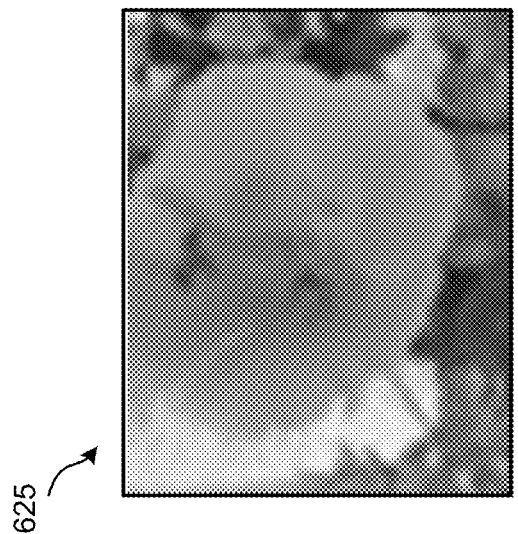

In one illustrative example, FIG. 6B illustrates an example overlap region 622 of an RGBIR image 310 (e.g., the first input image 406 of FIG. 4) and RGB image 615 (e.g., the second input image 408 of FIG. 4) determined by registering the first input image 406 and second input image 408 to one another (e.g., by operations 542 of FIG. 5), calculating a homography matrix and warping one of the first input image 406 and the second input image 408 and warping one of the images (e.g., by operations 544 and 546 of FIG. 5). In some cases, as noted above, the first input image 406 and second input image 408 can be cropped to use the overlapped portion for color correction. In the illustrated example of FIG. 6C, the cropped RGBIR image 625 was generated by cropping the overlap region 622 of the RGBIR image 310 of FIG. 6A.

Returning to FIG. 5, in some implementations, cropped images from the ROI computation engine 549 can be resized to a size that matches the resolution of the original input images 406, 408. For example, if the two input images 406, 408 initially have an Ultra-High Definition (UHD) resolution (e.g., 3840 pixels×2160 pixels) the cropped image(s) (one or both of which may have had pixels removed by the image cropping) can be scaled back up to UHD resolution. In some implementations, the cropped images can be resized to the original input image size(s).

Referring again to FIG. 4, the color correction engine 404 can utilize color information in the second input image 408 (e.g., RGB image 615 of FIG. 6B) to perform color correction on the first input image 406. In some cases, the color correction engine 404 may use a single color correction technique for correcting the first input image 406 based on the second input image 408. In some cases, the color correction engine 404 can apply a global color correction to all of the pixels of the first input image 406 (e.g., RGBIR image 310 of FIG. 6A). In some implementations, the first input image 406 can be captured by a main image sensor (e.g., an RGBIR sensor) of an image capture device. In some examples, the color correction engine 404 can apply a global color correction to the pixels of a cropped first input image (e.g., cropped RGBIR image 630) of the first input image 406. In some cases, the color correction engine 404 can apply a global color correction to every pixel of the RGBIR input image (e.g., RGBIR image 310 of FIG. 6A) to produce a color corrected image. The color correction engine 404 can utilize different color correction techniques to determine the color correction to apply to the first input image 406. In some implementations, the color correction engine 404 can be configured to dynamically switch between different color correction techniques. For example, if the illumination associated with the first input image 406 and the second input image 408 varied between illumination that includes IR light and illumination that does not include IR light, the color correction engine 404 can apply different color correction techniques.

In a first illustrative example color correction technique, the color correction engine 404 can compute a statistical measure (e.g., average values) for each color channel (e.g., a G channel average $G_{ref, ave}$, an R channel average $R_{ref, ave}$, and a B channel average, $B_{ref, ave}$) across all of the pixels in the image captured by the reference image sensor (e.g., pixels of the second input image 408 of FIG. 4). Similarly, the color correction engine 404 can compute a statistical measure (e.g., average values) for each color channel (e.g., a G channel average $G_{main, ave}$, an R channel average $R_{main, ave}$, and a B channel average $B_{main, ave}$) across all of the pixels in the image captured by the main image sensor (e.g., first input image 406 of FIG. 4). In such implementations, the color correction engine 404 can determine a correction ratio for each color (e.g., RGB), such as the following examples correction ratios for G shown in Equation (1A), R shown in Equation (1B) and B shown in Equation (1c) below:

$$G_{corr} = \frac{G_{ref, ave}}{G_{main, ave}} \quad (1A)$$

$$R_{corr} = \frac{R_{ref, ave}}{R_{main, ave}} \quad (1B)$$

$$B_{corr} = \frac{B_{ref, ave}}{B_{main, ave}} \quad (1C)$$

In some implementations, the RGB values of each pixel of the image captured by the main sensor (e.g., the first input image 406 of FIG. 4) can be multiplied by the corresponding correction ratio to produce a corrected image. For example, the R values of each pixel in the first image can be multiplied by $R_{corr}$, the B values for each pixel in the first input image 406 can be multiplied by $B_{corr}$, and the G values for each pixel in the first input image 406 can be multiplied by $G_{corr}$. In some cases, the reference sensor can be an auxiliary sensor covered by an IR cut filter with a lower resolution than the main image sensor. In one illustrative example, the reference sensor can include a single pixel with RGB photodiodes that measures a single RGB value from light captured from of a portion of the same scene as the main sensor. In another illustrative example, the reference sensor can include a 2×2 array of pixels with RGB photodiodes, each pixel corresponding approximately to a quadrant of the main sensor. In some cases, the portion of the same scene captured by the reference sensor can include the entire same scene or a subset of the same scene. In some cases, RGB values produced by the single pixel reference image sensor can be used as the average values shown in Equations (1A) through (1C) above. The preceding illustrative example describes determining a ratio for correcting the color based on RGB values from a reference image sensor. However, any numerical correspondence (e.g., a certain percentage value, ratio, proportion, function, relation, or the like) can be used for correcting color without departing from the scope of the present disclosure.

In some examples, the first input image 406 and second input image 408 can be divided into sections (e.g., sections 620 and 640 shown in FIG. 6D and/or FIG. 6E), a numerical correspondence between RGB values of the first input image 406 and RGBIR values of the second input image 408 can be determined in each of the sections, and corrections can be applied to each individual section based on the determined numerical correspondence.

In a second illustrative example, the systems and techniques can determine a color correction matrix (CCM) based on the second input image 408 (e.g., the image captured by the reference image sensor and first input image 406 (e.g., the image captured by the main image sensor). For example, a 3×4 CCM can produce corrected RGB values for each pixel in a corrected image by multiplying the CCM matrix by a vector containing the RGB and IR components of each pixel of the RGBIR image. In such cases, the IR channel of the IR image can contribute to the final RGB values of the pixels of corrected image. Equation (2) below illustrates an example of multiplying a 3×4 CCM $$[CCM_{3\times4}] = \begin{bmatrix} a_{RR} & a_{RG} & a_{RB} & a_{RIR} \\ a_{GR} & a_{GG} & a_{GB} & a_{GIR} \\ a_{BR} & a_{BG} & a_{BB} & a_{BIR} \end{bmatrix} \quad (2)$$

Where $a_{ij}$ are the coefficients of the 3×4 CCM, where i represents a color component in the corrected image (e.g., output image _ and j represents a color component in the RGBIR image (e.g., color corrected output image 410). Equation (3) below illustrates determining a corrected RGB pixel value $[R_{corr}\ R_{corr}\ B_{corr}]^T$ where $R_{corr}$, $G_{corr}$, $B_{corr}$ for one example pixel from the RGBIR image $$\begin{bmatrix} R_{corr} \\ G_{corr} \\ B_{corr} \end{bmatrix} = [CCM_{3\times4}] \cdot \begin{bmatrix} R_{RGBIR} \\ G_{RGBIR} \\ B_{RGBIR} \\ IR_{RGBIR} \end{bmatrix} \quad (3)$$

In some cases, the coefficients of the 3×4 CCM can be determined by dividing the first input image 406 and second input image 408 into sections, determining a color relationship between RGB values of the first input image 406 and RGBIR values of the second input image 408 in each of the sections, and optimizing the coefficients of the 3×4 CCM based on a combination of the color relationships for all of the sections. One illustrative example technique for optimizing the CCM coefficients is a least squares optimization.

Other image correction techniques can also be used to perform color corrections, such as using a three-dimensional lookup table (3D LUT). In one illustrative example, a 3D lookup table can include every possible RGB value captured by an RGBIR image sensor and a corresponding color corrected RGB color value. In another illustrative example, a similar look up table can be used only for the chrominance values (e.g., Cb, Cr of a YCbCr image) to allow the use of a two-dimensional look up table that includes correspondence a corrected chrominance value for every possible chrominance value produced by an RGBIR image sensor.

Figure 6E:
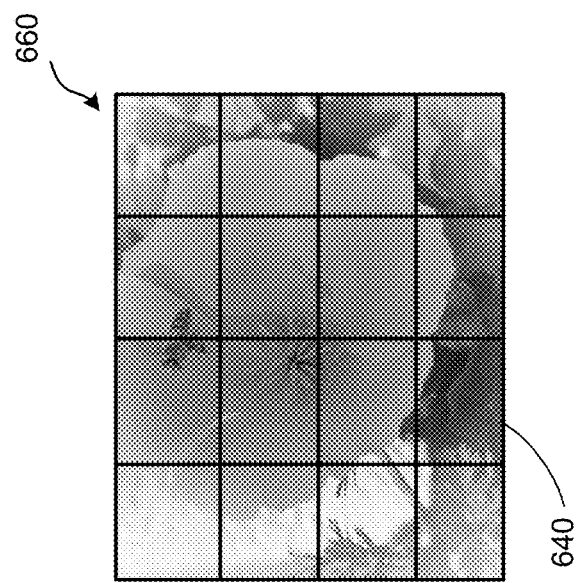
Figure 6E:
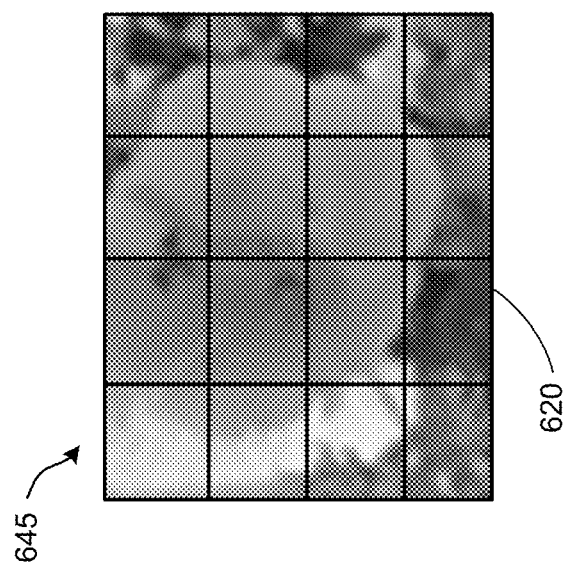

FIG. 6D illustrates an example of sections 620 overlaid on an RGB image 635 captured by an RGB reference sensor (e.g., second input image 408 of FIG. 4). Similarly, FIG. 6D illustrates sections 640 overlaid on an RGBIR image 310 captured by an RGBIR main sensor (e.g., first input image 406 of FIG. 4). In some cases, the sections 620 and 640 can represent subsets of pixels. As shown in the example of FIG. 6D, each of the sections 620 can have a corresponding section 640 that covers a corresponding portion of the captured scene. Although not shown in FIG. 6D, in some cases, the sections used to determine the CCM coefficients can be overlapping. FIG. 6E illustrates an adjusted RGB image 645 (e.g., upscaled by the image rectification engine 402 of FIG. 4) and shows the sections 620 overlaid on the adjusted RGB image 645. FIG. 6E also illustrates a cropped RGBIR image 660 (e.g., cropped by the image rectification engine 402 of FIG. 4) with sections 640 overlaid.

In a third illustrative example, a 3×3 CCM can perform three linear combinations of the RGB components of the first input image 406 (e.g., the RGBIR image) to produce corrected R, G, and B values for each pixel. In such an example, the IR channel of the first input image 406 can be ignored for the purposes of determining the final RGB values of the pixels of the corrected image.

$$[CCM_{3\times3}] = \begin{bmatrix} b_{RR} & b_{RG} & b_{RB} \\ b_{GR} & b_{GG} & b_{GB} \\ b_{BR} & b_{BG} & b_{BB} \end{bmatrix} \quad (4)$$

$$\begin{bmatrix} R_{corr} \\ G_{corr} \\ B_{corr} \end{bmatrix} = [CCM_{3\times3}] * \begin{bmatrix} R_{RGBIR} \\ G_{RGBIR} \\ B_{RGBIR} \end{bmatrix} \quad (5)$$

In some examples, the coefficients of the 3×3 CCM can be determined by dividing the first input image 406 and second input image 408 into sections (e.g., sections 620 and 640 shown in FIG. 6D and/or FIG. 6E), determining a color relationship between RGB values of the first input image 406 and RGBIR values of the second input image 408 in each of the sections, and optimizing the coefficients of the 3×3 CCM based on a combination of the color relationships for all of the sections.

The first, second, and third illustrative examples described above each describe applying an identical color correction to each pixel of first input image 406 (e.g., RGBIR image 310 of FIG. 6A) to produce a color corrected output image 410. In some cases, different color corrections can be applied to different pixels of the RGBIR image. For example, as described above and shown in FIG. 6D, the pixels of the main image sensor may be divided into sections (e.g., sections 620). In some cases, the systems and techniques can determine a color correction (e.g., using color correction ratios, color correction matrices, or the like) for each of the sections of the RGBIR image. In some cases, a machine learning model (e.g., a neural network) can determine which one or more color correction techniques to use for producing a color corrected output image. In some examples, the machine learning model can also be used to apply the color correction techniques. In some implementations, the machine learning model can also determine how to divide the image (e.g., into sections) for use in determining and/or applying color corrections to produce a corrected image.

In one illustrative example, additionally or alternatively to using sections 620 and 640 shown in FIGS. 6D and 6E to determine color corrections to apply globally to the first input image 406, the color correction engine 404 can determine different color corrections to be applied to each of the sections 640 of the first input image 406. In such an example, correction ratios (e.g., Equation 1A through Equation 1C), CCMs (e.g., 3×4 CCM of Equation (2) or 3×3 CCM of Equation (4)) any other color correction technique, or any combination thereof determined for each section 640 of the first input image 406 can be applied to pixels in a respective section 640 of the first input image 406 (or each pixel of a cropped first input image) to produce the color corrected output image 410. For example, the image color correction system 400 can determine a 3×4 CCM for each section 640 of the RGBIR image and apply a first determined 3×4 CCM to each pixel of the first input image 406 (or each pixel of a cropped first input image) in a first section of the sections 640 and a second determined 3×4 CCM to each pixel of a second section of the sections 640, and so on for each of the sections 640.

In addition, although sections are illustrated as a rectangular grid in FIGS. 6D and 6E, the first and second images can be divided into sections of any shape. In addition, the sections shown in FIG. 6E are shown to be non-overlapping, but overlapping sections can also be used. The image color correction system 400 also may not determine color corrections based on all of the pixels of the first input image 406 and second input image 408. In one illustrative example the image rectification engine 402 can determine regions for calculating color correction that correspond to feature points present in both first input image 406 and second input image 408 that are detected during the process of determining feature points for aligning the first input image 406 and second input image 408

Figure 6F:
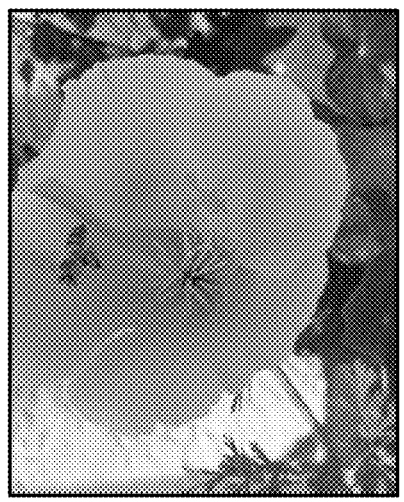

Returning to FIG. 4, after the first input image 406 is color corrected by the color correction engine 404, the image color correction system 400 can output a color corrected output image 410. FIG. 6F provides an example color corrected image 670, which can correspond to the color corrected output image 410 of FIG. 4. As shown, the color corrected image 670 can maintain the resolution of the RGBIR image, while providing more accurate color (e.g., compensating for the haze 312 shown in FIG. 3B).

In many cases, electronic devices that include camera functionality often contain multiple image sensor. As noted above, image color correction system 400 and related techniques described herein can allow images captured by a main sensor (e.g., an RGBIR image sensor) to be color corrected based on color images captured by a reference sensor (e.g., an RGB image sensor). In some cases, the reference sensor can be an auxiliary sensor used primarily for color correction of images from the main image sensor. In some cases, the reference sensor can be a fully functioning RGB image sensor included in an image capture system (e.g., a mobile device). In some implementations, the main sensor and reference sensor do not need to have identical resolutions. The systems and techniques described herein allow for inclusion of an IR sensitive image sensor (e.g., an RGBIR image sensor) that can provide both IR sensing capabilities, which can be used, for example, in low-light conditions, and accurate color representation in the presence of IR illumination. In some cases, the systems and techniques can reduce the size and/or weight of an electronic device incorporating IR sensing capability by eliminating the need for a dedicated IR sensor and/or a mechanism for physically moving an IR filter depending on illumination conditions.

Figure 7:
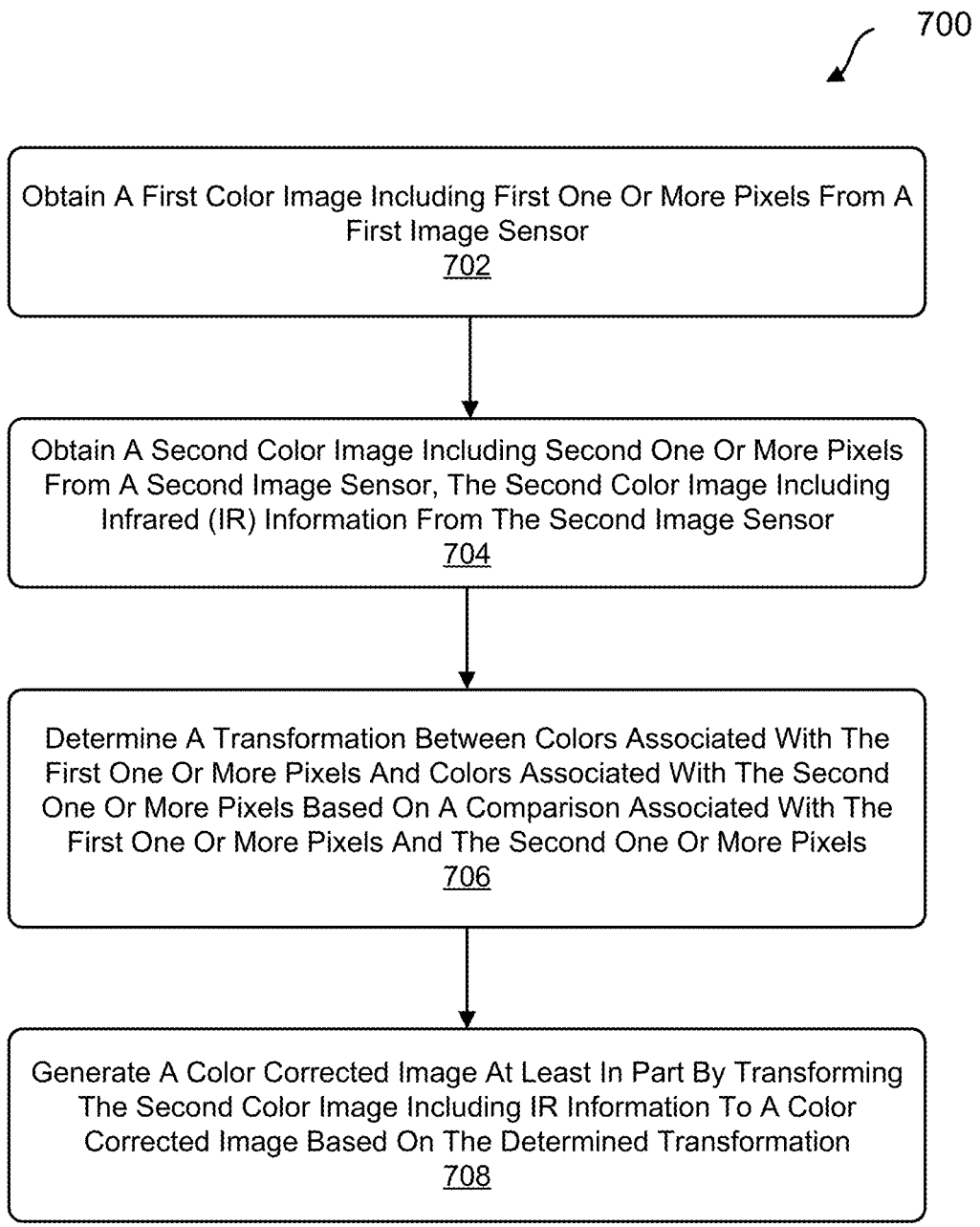
FIG. 7 is a flow diagram illustrating an example of a process for processing one or more frames, in accordance with some examples.

FIG. 7 is a flow diagram illustrating an example of a process 700 of processing one or more frames. At block 702, the process 700 includes obtaining a first color image (e.g., an RGB image) including first one or more pixels from a first image sensor. In one illustrative example, the first image sensor (e.g., image sensor 130 or second image sensor 180 of FIG. 1B) can be an auxiliary sensor in a device that includes multiple image sensors. In some cases, the first image sensor can have a different resolution from a second image sensor. In some cases, a field of view associated with the first one or more pixels at least partially overlaps with a field of view associated with the second one or more pixels. In some implementations, the first image sensor is associated with a first optical axis, and the second image sensor is associated with a second optical axis, different from the first optical axis. In some examples, the first image sensor has a first resolution, and the second image sensor has a second resolution, different from the first resolution. In some cases, the first image sensor comprises a single pixel. In some implementations the first image sensor comprises a plurality of pixels. In some cases, an IR cut filter is disposed between a lens of the first image sensor and the first image sensor. The IR cut filter can prevent IR light from reaching the first image sensor. In some cases, each of the first one or more pixels includes a corresponding red component, green component, and blue component and each of the second one or more pixels includes a corresponding red component, green component, and blue component. In some examples, the first one or more pixels do not include IR information.

At block 704, the process 700 includes obtaining a second color image including second one or more pixels from a second image sensor. The second color image includes infrared (IR) information from the second image sensor (e.g., image sensor 130 or second image sensor 180 of FIG. 1B).

At block 706, the process 700 includes determining a transformation between colors associated with the first one or more pixels and colors associated with the second one or more pixels based on a comparison associated with the first one or more pixels and the second one or more pixels. In some embodiments, determining the transformation comprises determining a first green statistical measure of the green components of the first one or more pixels and a second green statistical measure of the green components of the second one or more pixels and determining a green color correction based on a numerical correspondence of the first green statistical measure and the second green statistical measure. The process 700 can perform a similar determination for the blue components and red components for the first one or more pixels and the second one or more pixels. In some cases, determining the transformation between colors associated with the first one or more pixels and colors associated with the second one or more pixels includes dividing one or more of the first color image and the second color image into a plurality of sections. In some examples, the process 700 can determine a first section transformation associated with a first subset of the second one or more pixels associated. In some implementations, the process 700 can determine a second section transformation associated with a second subset of the second one or more pixels. The second subset of the second one or more pixels differs from the first subset by at least one pixel. In some cases, process 700 can determine a global transformation for generating the color corrected image based on the first section transformation and the second section transformation. Illustrative example techniques for determining a transformation between colors are described with respect to FIGS. 4, 5, and 6A through 6F.

At block 708, the process 700 includes generating a color corrected image at least in part by transforming the second color image including IR information to a color corrected image based on the determined transformation In some implementations, generating the color corrected image comprises applying the red color correction to the red components of each pixel of the second one or more pixels, applying the green color correction to the green components of each pixel of the second one or more pixels, and applying the blue color correction to the blue components of each pixel of the second one or more pixels. In one illustrative example, the transformation between colors of the first one or more pixels and colors of the second one or more pixels comprises a color correction matrix. In some cases, generating the color corrected image comprises applying the determined transformation to the second one or more pixels to produce first color corrected pixels. In some implementations, generating the color correct image includes at least in part transforming the first subset of the second one or more pixels by the first section transformation and transforming the second subset of the second one or more pixels by the second section transformation.

In some examples, the processes described herein (e.g., process 700 and/or other process described herein) may be performed by a computing device or apparatus. In another example, one or more of the processes can be performed by the computing system 1000 shown in FIG. 10. For instance, a computing device with the computing system 1000 shown in FIG. 10 can include the components of image color correction system 400 of FIG. 4 and can implement the operations of the process 700 of FIG. 7 and/or other process described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 700 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
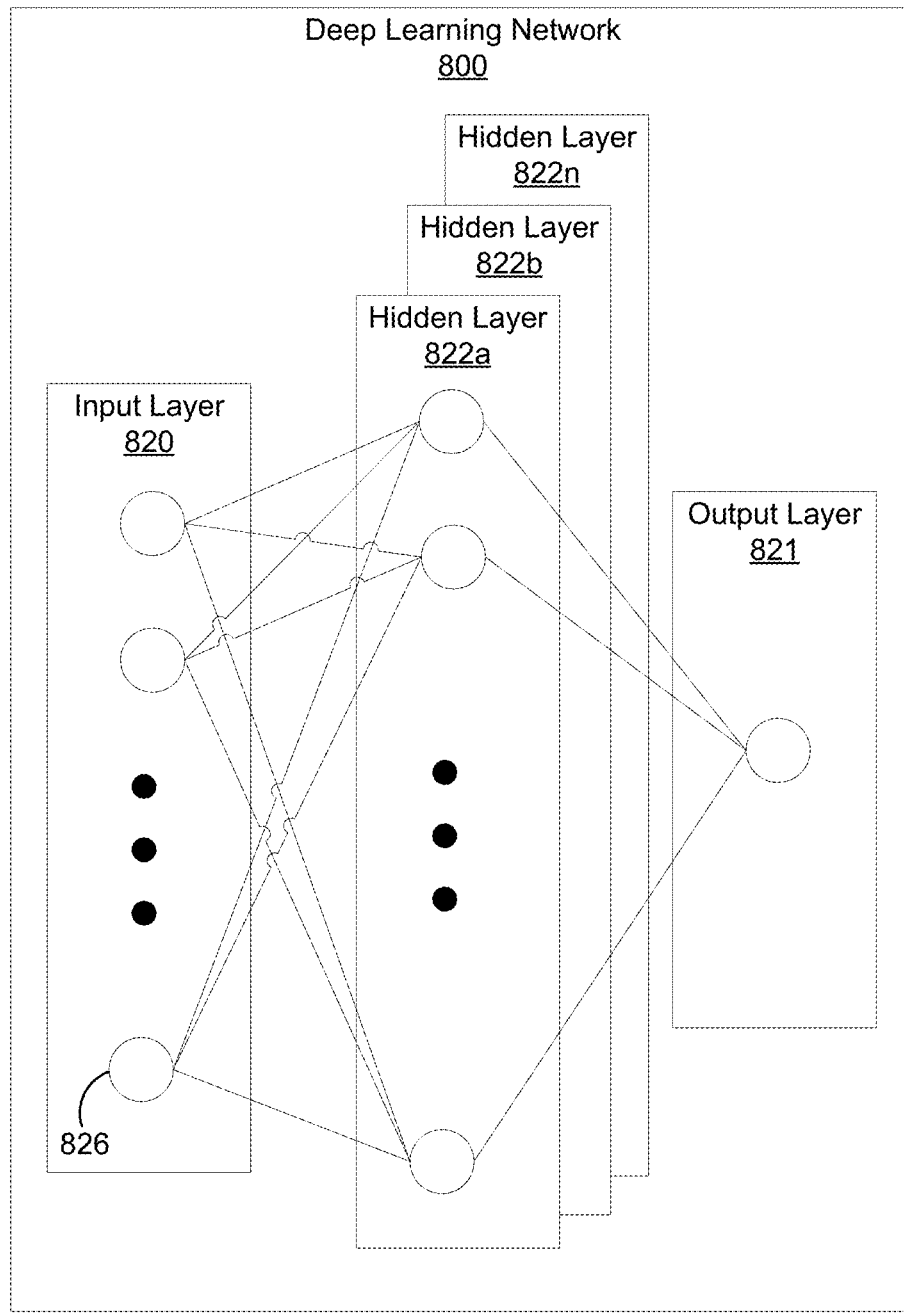
FIG. 8 is a block diagram illustrating an example of a deep learning network, in accordance with some examples.

As noted above, various aspects of the present disclosure can use machine learning models or systems. FIG. 8 is an illustrative example of a deep learning neural network 800 that can be used to implement the machine learning based feature extraction described above. An input layer 820 includes input data. In one illustrative example, the input layer 820 can include data representing the pixels of an input image. The neural network 800 includes multiple hidden layers 822a, 822b, through 822n. The hidden layers 822a, 822b, through 822n include "n" number of hidden layers, where "n" is an integer greater than or equal to one. The number of hidden layers can be made to include as many layers as needed for the given application. The neural network 800 further includes an output layer 821 that provides an output resulting from the processing performed by the hidden layers 822a, 822b, through 822n. In one illustrative example, the output layer 821 can provide a classification for an object in an input image. The classification can include a class identifying the type of activity (e.g., looking up, looking down, closing eyes, yawning, etc.).

The neural network 800 is a multi-layer neural network of interconnected nodes. Each node can represent a piece of information. Information associated with the nodes is shared among the different layers and each layer retains information as information is processed. In some cases, the neural network 800 can include a feed-forward network, in which case there are no feedback connections where outputs of the network are fed back into itself. In some cases, the neural network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the first hidden layer 822a can transform the information of each input node by applying activation functions to the input node information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 821, at which an output is provided. In some cases, while nodes (e.g., node 826) in the neural network 800 are shown as having multiple output lines, a node has a single output and all lines shown as being output from a node represent the same output value.

In some cases, each node or interconnection between nodes can have a weight that is a set of parameters derived from the training of the neural network 800. Once the neural network 800 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 820 using the different hidden layers 822*a*, 822*b*, through 822*n* in order to provide the output through the output layer 821. In an example in which the neural network 800 is used to identify features in images to perform image registration, the neural network 800 can be trained using training data that includes both images and labels, as described above. For instance, training images can be input into the network, with each training image having a label indicating the features in the image (for the feature extraction machine learning system) or a label indicating classes of objects in each image. In one example using object classification for illustrative purposes, a training image can include an image of a number 2, in which case the label for the image can be [0 0 1 0 0 0 0 0 0 0].

In some cases, the neural network 800 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 800 is trained well enough so that the weights of the layers are accurately tuned.

For the example of identifying objects in frames, the forward pass can include passing a training frame through the neural network 800. The weights are initially randomized before the neural network 800 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 800, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 800 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 800 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 800 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 800 can include any other deep network other than a CNN, such as an autoencoder, a deep belief nets (DBNs), a Recurrent Neural Networks (RNNs), among others.

Figure 9:
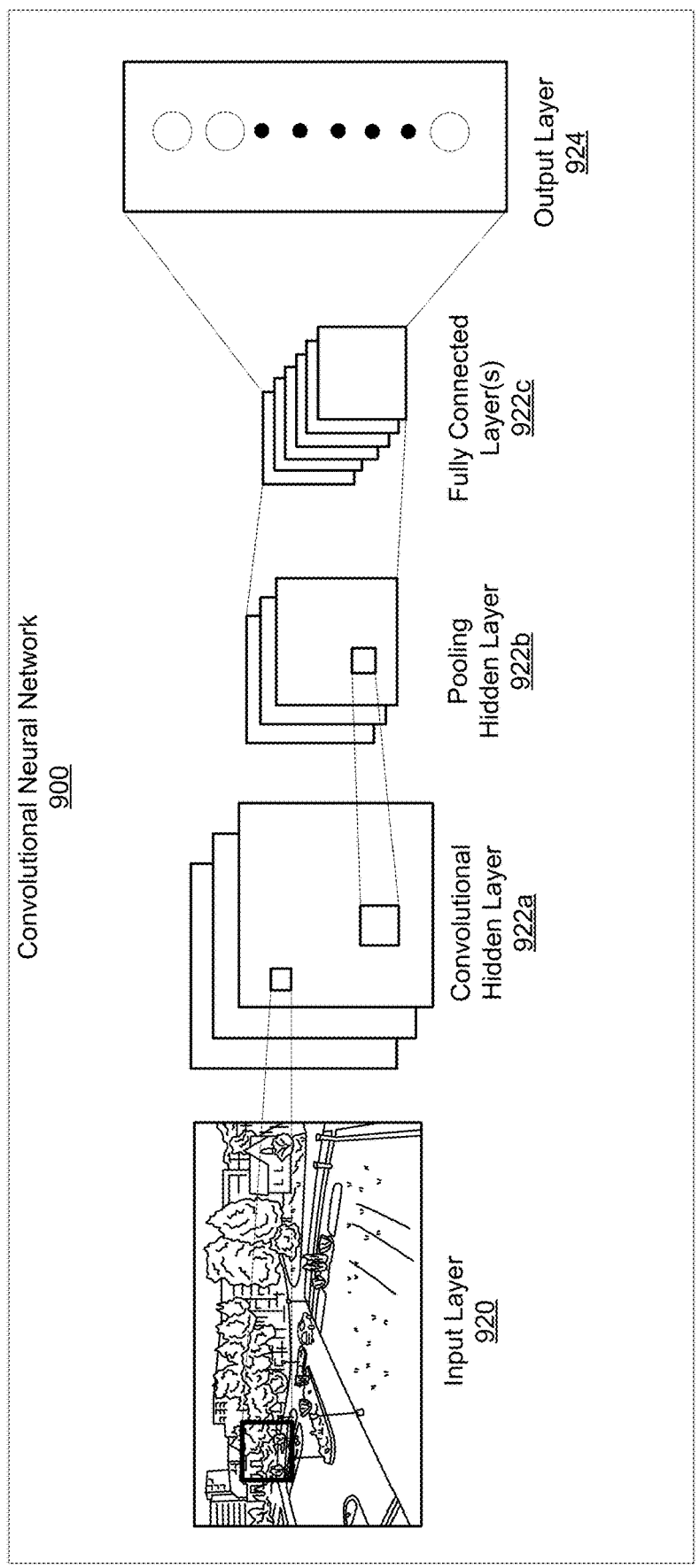
FIG. 9 is a block diagram illustrating an example of a convolutional neural network, in accordance with some examples.

FIG. 9 is an illustrative example of a convolutional neural network (CNN) 900. The input layer 920 of the CNN 900 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 922*a*, an optional non-linear activation layer, a pooling hidden layer 922*b*, and fully connected hidden layers 922*c* to get an output at the output layer 924. While only one of each hidden layer is shown in FIG. 9, one of ordinary skill will appreciate that multiple convolutional hidden layers, non-linear layers, pooling hidden layers, and/or fully connected layers can be included in the CNN 900. As previously described, the output can indicate a single class of an object or can include a probability of classes that best describe the object in the image.

The first layer of the CNN 900 is the convolutional hidden layer 922*a*. The convolutional hidden layer 922*a* analyzes the image data of the input layer 920. Each node of the convolutional hidden layer 922*a* is connected to a region of nodes (pixels) of the input image called a receptive field. The convolutional hidden layer 922*a* can be considered as one or more filters (each filter corresponding to a different activation or feature map), with each convolutional iteration of a filter being a node or neuron of the convolutional hidden layer 922a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 922a. Each connection between a node and a receptive field for that node learns a weight and, in some cases, an overall bias such that each node learns to analyze its particular local receptive field in the input image. Each node of the hidden layer 922a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 922a is due to each node of the convolutional layer being applied to its corresponding receptive field. For example, a filter of the convolutional hidden layer 922a can begin in the top-left corner of the input image array and can convolve around the input image. As noted above, each convolutional iteration of the filter can be considered a node or neuron of the convolutional hidden layer 922a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 922a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 922a.

The mapping from the input layer to the convolutional hidden layer 922a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 922a can include several activation maps in order to identify multiple features in an image. The example shown in FIG. 9 includes three activation maps. Using three activation maps, the convolutional hidden layer 922a can detect three different kinds of features, with each feature being detectable across the entire image.

In some examples, a non-linear hidden layer can be applied after the convolutional hidden layer 922a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 900 without affecting the receptive fields of the convolutional hidden layer 922a.

The pooling hidden layer 922b can be applied after the convolutional hidden layer 922a (and after the non-linear hidden layer when used). The pooling hidden layer 922b is used to simplify the information in the output from the convolutional hidden layer 922a. For example, the pooling hidden layer 922b can take each activation map output from the convolutional hidden layer 922a and generates a condensed activation map (or feature map) using a pooling function. Max-pooling is one example of a function performed by a pooling hidden layer. Other forms of pooling functions be used by the pooling hidden layer 922a, such as average pooling, L2-norm pooling, or other suitable pooling functions. A pooling function (e.g., a max-pooling filter, an L2-norm filter, or other suitable pooling filter) is applied to each activation map included in the convolutional hidden layer 922a. In the example shown in FIG. 9, three pooling filters are used for the three activation maps in the convolutional hidden layer 922a.

In some examples, max-pooling can be used by applying a max-pooling filter (e.g., having a size of 2×2) with a stride (e.g., equal to a dimension of the filter, such as a stride of 2) to an activation map output from the convolutional hidden layer 922a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 922a having a dimension of 24×24 nodes, the output from the pooling hidden layer 922b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 900.

The final layer of connections in the network is a fully-connected layer that connects every node from the pooling hidden layer 922b to every one of the output nodes in the output layer 924. Using the example above, the input layer includes 28×28 nodes encoding the pixel intensities of the input image, the convolutional hidden layer 922a includes 3×24×24 hidden feature nodes based on application of a 5×5 local receptive field (for the filters) to three activation maps, and the pooling hidden layer 922b includes a layer of 3×12×12 hidden feature nodes based on application of max-pooling filter to 2×2 regions across each of the three feature maps. Extending this example, the output layer 924 can include ten output nodes. In such an example, every node of the 3×12×12 pooling hidden layer 922b is connected to every node of the output layer 924.

The fully connected layer 922c can obtain the output of the previous pooling hidden layer 922b (which should represent the activation maps of high-level features) and determines the features that most correlate to a particular class. For example, the fully connected layer 922c layer can determine the high-level features that most strongly correlate to a particular class, and can include weights (nodes) for the high-level features. A product can be computed between the weights of the fully connected layer 922c and the pooling hidden layer 922b to obtain probabilities for the different classes. For example, if the CNN 900 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 924 can include an M-dimensional vector (in the prior example, M=10). M indicates the number of classes that the CNN 900 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for processing images, comprising: obtaining a first color image including first one or more pixels from a first image sensor; obtaining a second color image including second one or more pixels from a second image sensor, the second color image including infrared (IR) information from the second image sensor; determining a transformation between colors associated with the first one or more pixels and colors associated with the second one or more pixels based on a comparison associated with the first one or more pixels and the second one or more pixels; and generating a color corrected image at least in part by transforming the second color image including IR information to a color corrected image based on the determined transformation.

Aspect 2: The method of Aspect 1, wherein a field of view associated with the first one or more pixels at least partially overlaps with a field of view associated with the second one or more pixels.

Aspect 3: The method of any of Aspects 1 to 2, wherein the first image sensor is associated with a first optical axis, and the second image sensor is associated with a second optical axis, different from the first optical axis.

Aspect 4: The method of any of Aspects 1 to 3, wherein the first image sensor has a first resolution, and the second image sensor has a second resolution, different from the first resolution.

Aspect 5: The method of any of Aspects 1 to 4, wherein the first image sensor comprises a single pixel.

Aspect 6: The method of any of Aspects 1 to 5, wherein the first image sensor comprises a plurality of pixels.

Aspect 7: The method of any of Aspects 1 to 6, wherein an IR cut filter is disposed between a lens of the first image sensor and the first image sensor.

Aspect 8: The method of any of Aspects 1 to 7, wherein each of the first one or more pixels includes a corresponding red component, green component, and blue component and each of the second one or more pixels includes a corresponding red component, green component, and blue component, and determining the transformation between colors associated with the first one or more pixels and colors associated with the second one or more pixels comprises: determining a first green statistical measure of the green components of the first one or more pixels and a second green statistical measure of the green components of the second one or more pixels; determining a first red statistical measure of the red components of the first one or more pixels and a second red statistical measure of the red components of the second one or more pixels; determining a first blue statistical measure of the blue components of the first one or more pixels and a second blue statistical measure of the blue components of the second one or more pixels; determining a green color correction based on a numerical correspondence of the first green statistical measure and the second green statistical measure; determining a red color correction based on a numerical correspondence of the first red statistical measure and the second red statistical measure; and determining a blue color correction based on a numerical correspondence of the first blue statistical measure and the second blue statistical measure.

Aspect 9: The method of any of Aspects 1 to 8, wherein generating the color corrected image comprises applying the red color correction to the red components of each pixel of the second one or more pixels, applying the green color correction to the green components of each pixel of the second one or more pixels, and applying the blue color correction to the blue components of each pixel of the second one or more pixels.

Aspect 10: The method of any of Aspects 1 to 9, wherein the transformation between colors of the first one or more pixels and colors of the second one or more pixels comprises a color correction matrix.

Aspect 11: The method of any of Aspects 1 to 10, wherein generating the color corrected image comprises applying the determined transformation to the second one or more pixels to produce first color corrected pixels.

Aspect 12: The method of any of Aspects 1 to 11, wherein determining the transformation between colors associated with the first one or more pixels and colors associated with the second one or more pixels comprises: dividing one or more of the first color image and the second color image into a plurality of sections; determining a first section transformation associated with a first subset of the second one or more pixels associated; and determining a second section transformation associated with a second subset of the second one or more pixels, wherein the second subset of the second one or more pixels differs from the first subset by at least one pixel.

Aspect 13: The method of any of Aspects 1 to 12, further comprising determining a global transformation for generating the color corrected image based on the first section transformation and the second section transformation.

Aspect 14: The method of any of Aspects 1 to 13, further comprising generating the color corrected image at least in part by transforming the first subset of the second one or more pixels by the first section transformation and transforming the second subset of the second one or more pixels by the second section transformation.

Aspect 15: The method of any of Aspects 1 to 14, wherein the first one or more pixels do not include IR information Aspect 16: A apparatus for processing images, comprising: a memory; and one or more processors coupled to the memory and configured to: obtain a first color image including first one or more pixels from a first image sensor, obtain a second color image including second one or more pixels from a second image sensor, the second color image including infrared (IR) information from the second image sensor, determine a transformation between colors associated with the first one or more pixels and colors associated with the second one or more pixels based on a comparison associated with the first one or more pixels and the second one or more pixels, and generate a color corrected image at least in part by transform the second color image including IR information to a color corrected image based on the determined transformation.

Aspect 17: The apparatus of Aspect 16, wherein a field of view associated with the first one or more pixels at least partially overlaps with a field of view associated with the second one or more pixels.

Aspect 18: The apparatus of any of Aspects 16 to 17, wherein the first image sensor is associated with a first optical axis, and the second image sensor is associated with a second optical axis, different from the first optical axis.

Aspect 19: The apparatus of any of Aspects 16 to 18, wherein the first image sensor has a first resolution, and the second image sensor has a second resolution, different from the first resolution.

Aspect 20: The apparatus of any of Aspects 16 to 19, wherein the first image sensor comprises a single pixel.

Aspect 21: The apparatus of any of Aspects 16 to 20, wherein the first image sensor comprises a plurality of pixels.

Aspect 22: The apparatus of any of Aspects 16 to 21, wherein an IR cut filter is disposed between a lens of the first image sensor and the first image sensor.

Aspect 23: The apparatus of any of Aspects 16 to 22, wherein the one or more processors are configured to: determine a first green statistical measure of the green components of the first one or more pixels and a second green statistical measure of the green components of the second one or more pixels; determine a first red statistical measure of the red components of the first one or more pixels and a second red statistical measure of the red components of the second one or more pixels; determine a first blue statistical measure of the blue components of the first one or more pixels and a second blue statistical measure of the blue components of the second one or more pixels; determine a green color correction based on a numerical correspondence of the first green statistical measure and the second green statistical measure; determine a red color correction based on a numerical correspondence of the first red statistical measure and the second red statistical measure; and determine a blue color correction based on a numerical correspondence of the first blue statistical measure and the second blue statistical measure.

Aspect 24: The apparatus of any of Aspects 16 to 23, wherein generating the color corrected image comprises applying the red color correction to the red components of each pixel of the second one or more pixels, applying the green color correction to the green components of each pixel of the second one or more pixels, and applying the blue color correction to the blue components of each pixel of the second one or more pixels.

Aspect 25: The apparatus of any of Aspects 16 to 24, wherein the transformation between colors of the first one or more pixels and colors of the second one or more pixels comprises a color correction matrix.

Aspect 26: The apparatus of any of Aspects 16 to 25, wherein generating the color corrected image comprises applying the determined transformation to the second one or more pixels to produce first color corrected pixels.

Aspect 27: The apparatus of any of Aspects 16 to 26, wherein the one or more processors are configured to: divide one or more of the first color image and the second color image into a plurality of sections; determine a first section transformation associated with a first subset of the second one or more pixels associated; and determine a second section transformation associated with a second subset of the second one or more pixels, wherein the second subset of the second one or more pixels differs from the first subset by at least one pixel.

Aspect 28: The apparatus of any of Aspects 16 to 27, wherein the one or more processors are configured to: determine a global transformation for generate the color corrected image based on the first section transformation and the second section transformation.

Aspect 29: The apparatus of any of Aspects 16 to 28, wherein the one or more processors are configured to: generate the color corrected image at least in part by transform the first subset of the second one or more pixels by the first section transformation and transform the second subset of the second one or more pixels by the second section transformation.

Aspect 30: The apparatus of any of Aspects 16 to 29, wherein the first one or more pixels do not include IR information Aspect 31: A non-transitory computer-readable storage medium having stored thereon instructions which, when executed by one or more processors, cause the one or more processors to perform any of the operations of aspects 1 to 30.

Aspect 32: An apparatus comprising means for performing any of the operations of aspects 1 to 30.

What is claimed is:

1. A method for processing images, comprising:
obtaining a first color image including first one or more pixels from a first image sensor, wherein an infrared (IR) cut filter is disposed between a lens of the first image sensor and the first one or more pixels from the first image sensor;
obtaining a second color image including second one or more pixels from a second image sensor, the second color image including IR information from the second image sensor;
determining a transformation between colors associated with the first one or more pixels and colors associated with the second one or more pixels based on a comparison associated with the first one or more pixels and the second one or more pixels; and
generating a color corrected image at least in part by transforming the second color image including IR information to a color corrected image based on the determined transformation.

2. The method of claim 1, wherein a field of view associated with the first one or more pixels at least partially overlaps with a field of view associated with the second one or more pixels.

3. The method of claim 1, wherein the first image sensor is associated with a first optical axis, and the second image sensor is associated with a second optical axis, different from the first optical axis.

4. The method of claim 1, wherein the first image sensor has a first resolution, and the second image sensor has a second resolution, different from the first resolution.

5. The method of claim 1, wherein the first image sensor comprises a single pixel.

6. The method of claim 1, wherein the first image sensor comprises a plurality of pixels.

7. The method of claim 1, wherein each of the first one or more pixels includes a corresponding red component, green component, and blue component and each of the second one or more pixels includes a corresponding red component, green component, and blue component, and wherein determining the transformation between colors associated with the first one or more pixels and colors associated with the second one or more pixels comprises:
determining a first green statistical measure of green components of the first one or more pixels and a second green statistical measure of green components of the second one or more pixels;
determining a first red statistical measure of red components of the first one or more pixels and a second red statistical measure of red components of the second one or more pixels;
determining a first blue statistical measure of blue components of the first one or more pixels and a second blue statistical measure of blue components of the second one or more pixels;
determining a green color correction based on a numerical correspondence of the first green statistical measure and the second green statistical measure;
determining a red color correction based on a numerical correspondence of the first red statistical measure and the second red statistical measure; and
determining a blue color correction based on a numerical correspondence of the first blue statistical measure and the second blue statistical measure.

8. The method of claim 7, wherein generating the color corrected image comprises applying the red color correction to the red components of each pixel of the second one or more pixels, applying the green color correction to the green components of each pixel of the second one or more pixels, and applying the blue color correction to the blue components of each pixel of the second one or more pixels.

9. The method of claim 1, wherein the transformation between colors of the first one or more pixels and colors of the second one or more pixels comprises a color correction matrix.

10. The method of claim 1, wherein generating the color corrected image comprises applying the determined transformation to the second one or more pixels to produce first color corrected pixels.

11. The method of claim 1, wherein determining the transformation between colors associated with the first one or more pixels and colors associated with the second one or more pixels comprises:
dividing one or more of the first color image and the second color image into a plurality of sections;
determining a first section transformation associated with a first subset of the second one or more pixels associated; and
determining a second section transformation associated with a second subset of the second one or more pixels, wherein the second subset of the second one or more pixels differs from the first subset by at least one pixel.

12. The method of claim 11, further comprising determining a global transformation for generating the color corrected image based on the first section transformation and the second section transformation.

13. The method of claim 11, further comprising generating the color corrected image at least in part by transforming the first subset of the second one or more pixels by the first section transformation and transforming the second subset of the second one or more pixels by the second section transformation.

14. The method of claim 1, wherein the first one or more pixels do not include IR information.

15. An apparatus for processing images, comprising:
a memory; and
one or more processors coupled to the memory and configured to:
obtain a first color image including first one or more pixels from a first image sensor, wherein an infrared (IR) cut filter is disposed between a lens of the first image sensor and the first one or more pixels from the first image sensor;
obtain a second color image including second one or more pixels from a second image sensor, the second color image including IR information from the second image sensor;
determine a transformation between colors associated with the first one or more pixels and colors associated with the second one or more pixels based on a comparison associated with the first one or more pixels and the second one or more pixels; and
generate a color corrected image at least in part by transform the second color image including IR information to a color corrected image based on the determined transformation.

16. The apparatus of claim 15, wherein a field of view associated with the first one or more pixels at least partially overlaps with a field of view associated with the second one or more pixels.

17. The apparatus of claim 15, wherein the first image sensor is associated with a first optical axis, and the second image sensor is associated with a second optical axis, different from the first optical axis.

18. The apparatus of claim 15, wherein the first image sensor has a first resolution, and the second image sensor has a second resolution, different from the first resolution.

19. The apparatus of claim 15, wherein the first image sensor comprises a single pixel.

20. The apparatus of claim 15, wherein the first image sensor comprises a plurality of pixels.

21. The apparatus of claim 15, wherein:
each of the first one or more pixels includes a corresponding red component, green component, and blue component and each of the second one or more pixels includes a corresponding red component, green component, and blue component; and
to determine the transformation between colors associated with the first one or more pixels and colors associated with the second one or more pixels, the one or more processors are configured to:
determine a first green statistical measure of green components of the first one or more pixels and a second green statistical measure of green components of the second one or more pixels;
determine a first red statistical measure of red components of the first one or more pixels and a second red statistical measure of red components of the second one or more pixels;
determine a first blue statistical measure of blue components of the first one or more pixels and a second blue statistical measure of blue components of the second one or more pixels;
determine a green color correction based on a numerical correspondence of the first green statistical measure and the second green statistical measure;
determine a red color correction based on a numerical correspondence of the first red statistical measure and the second red statistical measure; and
determine a blue color correction based on a numerical correspondence of the first blue statistical measure and the second blue statistical measure.

22. The apparatus of claim 21, wherein, to generate the color corrected image, the one or more processors are configured to apply the red color correction to the red components of each pixel of the second one or more pixels, apply the green color correction to the green components of each pixel of the second one or more pixels, and apply the blue color correction to the blue components of each pixel of the second one or more pixels.

23. The apparatus of claim 15, wherein the transformation between colors of the first one or more pixels and colors of the second one or more pixels comprises a color correction matrix.

24. The apparatus of claim 15, wherein, to generate the color corrected image, the one or more processors are configured to apply the determined transformation to the second one or more pixels to produce first color corrected pixels.

25. The apparatus of claim 15, wherein the one or more processors are configured to:
divide one or more of the first color image and the second color image into a plurality of sections;
determine a first section transformation associated with a first subset of the second one or more pixels associated; and
determine a second section transformation associated with a second subset of the second one or more pixels, wherein the second subset of the second one or more pixels differs from the first subset by at least one pixel.

26. The apparatus of claim 25, wherein the one or more processors are configured to: determine a global transformation for generate the color corrected image based on the first section transformation and the second section transformation.

27. The apparatus of claim 25, wherein the one or more processors are configured to: generate the color corrected image at least in part by transform the first subset of the second one or more pixels by the first section transformation and transform the second subset of the second one or more pixels by the second section transformation.

28. The apparatus of claim 15, wherein the first one or more pixels do not include IR information.

* * * * *